(12) United States Patent
Iwabuchi

(10) Patent No.: US 11,479,061 B2
(45) Date of Patent: Oct. 25, 2022

(54) TIRE

(71) Applicant: BRIDGESTONE CORPORATION, Tokyo (JP)

(72) Inventor: Sotaro Iwabuchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 36 days.

(21) Appl. No.: 16/766,706

(22) PCT Filed: Dec. 3, 2018

(86) PCT No.: PCT/JP2018/044415
§ 371 (c)(1),
(2) Date: May 25, 2020

(87) PCT Pub. No.: WO2019/111854
PCT Pub. Date: Jun. 13, 2019

(65) Prior Publication Data
US 2020/0307323 A1      Oct. 1, 2020

(30) Foreign Application Priority Data

Dec. 8, 2017 (JP) .............................. JP2017-236465

(51) Int. Cl.
*B60C 11/13* (2006.01)
*B60C 11/24* (2006.01)
*B60C 11/03* (2006.01)

(52) U.S. Cl.
CPC ...... *B60C 11/1353* (2013.01); *B60C 11/1307* (2013.01); *B60C 11/24* (2013.01);
(Continued)

(58) Field of Classification Search
CPC ............ B60C 11/1307; B60C 11/1353; B60C 2011/1338; B60C 2011/1361
See application file for complete search history.

(56) References Cited

U.S. PATENT DOCUMENTS 5,370,167 A * 12/1994 Kogure .................... B60C 9/18
152/209.18
2001/0032691 A1   10/2001   Ohsawa
(Continued)

FOREIGN PATENT DOCUMENTS

CN            1583432 A       2/2005
CN          102248616 A      11/2011
(Continued)

OTHER PUBLICATIONS

Machine translation for Japan 58-134105 U (Year: 2021).*
(Continued)

*Primary Examiner* — Steven D Maki
(74) *Attorney, Agent, or Firm* — Solaris Intellectual Property Group, PLLC

(57) ABSTRACT

A tire that can suppress an unused tire from giving an impression like a worn tire as compared with a case where the brightness of a tread surface and the brightness of a bottom surface of a groove are the same is obtained. The tread portion includes a tread portion including a tread surface and a groove that partitions the tread surface; and a plurality of protrusions that protrude from a bottom surface of the groove at a height of from 0.1 mm to 1.0 mm and are arranged at an interval of from more than 0.1 mm to 1.0 mm. A ratio of a height of the protrusions to a depth of the groove (protrusion height/groove depth) is from 0.02 to 0.2 mm.

6 Claims, 15 Drawing Sheets

(52) U.S. Cl.
CPC .......... *B60C 2011/0355* (2013.01); *B60C 2011/0379* (2013.01); *B60C 2011/1338* (2013.01); *B60C 2011/1361* (2013.01)

(56) References Cited

U.S. PATENT DOCUMENTS

| | | | |
|---|---|---|---|
| 2004/0108035 A1 | 6/2004 | Majumdar | |
| 2005/0039834 A1 | 2/2005 | Suzuki | |
| 2009/0218019 A1* | 9/2009 | Paturle | B29D 30/0606 |
| | | | 152/209.18 |
| 2010/0243116 A1 | 9/2010 | Yasunaga | |
| 2011/0125465 A1* | 5/2011 | Buresh | B60C 11/0323 |
| | | | 703/1 |
| 2011/0285064 A1 | 11/2011 | Ohara | |
| 2012/0168049 A1 | 7/2012 | Jenkins et al. | |
| 2015/0083306 A1 | 3/2015 | Colby et al. | |
| 2015/0165829 A1 | 6/2015 | Ogane et al. | |
| 2017/0066292 A1* | 3/2017 | Cambon | B60C 11/1307 |
| 2017/0072749 A1 | 3/2017 | Muhlhoff et al. | |
| 2017/0136830 A1 | 5/2017 | Kuwano | |
| 2017/0246917 A1* | 8/2017 | Iwabuchi | B60C 13/00 |
| 2018/0001714 A1 | 1/2018 | Sato et al. | |
| 2018/0072107 A1 | 3/2018 | Muhlhoff et al. | |
| 2018/0141390 A1* | 5/2018 | Miyasaka | B60C 13/001 |
| 2021/0188018 A1* | 6/2021 | Iwabuchi | B60C 11/03 |

FOREIGN PATENT DOCUMENTS

| | | |
|---|---|---|
| CN | 102421609 A | 4/2012 |
| CN | 104203604 A | 12/2014 |
| CN | 106103136 A | 11/2016 |
| CN | 106103141 A | 11/2016 |
| CN | 106364261 A | 2/2017 |
| CN | 106660404 A | 5/2017 |
| CN | 107405965 A | 11/2017 |
| JP | 58-134105 U * | 9/1983 |
| JP | S60-36304 U | 3/1985 |
| JP | H06-99705 A | 4/1994 |
| JP | 2002-219906 A | 8/2002 |
| JP | 2003-048408 A | 2/2003 |
| JP | 2004-196145 A * | 7/2004 |
| JP | 2004-196145 A | 7/2004 |
| JP | 2009-512584 A | 3/2009 |
| JP | 2010-254240 A | 11/2010 |
| JP | 2014-218101 A | 11/2014 |
| JP | 2017-507078 A | 3/2017 |
| JP | 2017-088098 A | 5/2017 |
| WO | 2010/070690 A1 | 6/2010 |
| WO | WO-2016/067854 A1 * | 5/2016 |
| WO | 2016/182076 A1 | 11/2016 |
| WO | WO-2016/182076 A1 * | 11/2016 |

OTHER PUBLICATIONS

Machine translation for Japan 2004-196145 (Year: 2021).*
Search Report of the Chinese office action dated Sep. 8, 2021, from the SIPO in a Chinese patent application No. 2018800788285 corresponding to the instant patent application.
International Search Report issued in International Application No. PCT/JP2018/044415 dated Mar. 5, 2019.
Xiaoqing, "City Vehicles", Issue 01, Car tire pattern escorts safe driving, pp. 52-57, Jan. 15, 2008.
Search Report of the notification to grant patent right for invention dated Apr. 12, 2022, from the SIPO in a Chinese patent application No. 201880078828.5 corresponding to the instant patent application.

* cited by examiner

TIRE

TECHNICAL FIELD

The present disclosure relates to a tire having a groove formed in a tread portion.

BACKGROUND ART

WO 2009/512584 A discloses a technique for providing a contrast on the surface of an article by forming a pattern having a plurality of strands on at least a part of the surface of the article.

SUMMARY OF INVENTION

Technical Problem

In a tread portion of a tire, a tread surface and a groove that partitions the tread surface are formed. When the brightness of the tread surface and the brightness of a bottom surface of the groove are the same, the contrast between the tread surface and the bottom surface of the groove is weakened, and the groove may look shallow even in an unused state. If the groove looks shallow, an unused tire may give an impression like a worn tire (tire worn by friction with a road surface).

An object of the present disclosure is to suppress an unused tire from giving an impression like a worn tire as compared with a case where the brightness of the tread surface and the brightness of the bottom surface of the groove are the same.

Solution to Problem

A tire according to a first aspect has a feature of including: a tread portion including a tread portion including a tread surface and a groove that partitions the tread surface; and a plurality of protrusions that protrude from a bottom surface of the groove at a height of from 0.1 mmmm to 1.0 mmmm and are arranged at an interval of from more than 0.1 mmmm to 1.0 mmmm, wherein a ratio of a height of the protrusions to a depth of the groove (protrusion height/groove depth) is from 0.02 to 0.2.

According to the above configuration, the plurality of protrusions protrude from the bottom surface of the groove of the tread portion. The height of the protrusions is from 0.1 mmmm to 1.0 mmmm, and the plurality of protrusions are arranged at an interval of from more than 0.1 mmmm to 1.0 mmmm. The ratio of the height of the protrusions to the groove depth of the groove (protrusion height/groove depth) is from 0.02 to 0.2. For this reason, light incident on the inside of the groove is applied onto the protrusion and changed in the reflection direction. Then, the amount of light emitted to the outside of the groove decreases.

Here, for example, when the ratio of the height of the protrusions to the depth of the groove is less than 0.02, the height of the protrusions is too low with respect to the depth of the groove. For this reason, the light incident on the inside of the groove is applied onto the protrusion and changed in the reflection direction, but the amount of light emitted to the outside of the groove does not sufficiently decrease. However, since the ratio of the height of the protrusions to the depth of the groove is 0.02 or more, the amount of light emitted to the outside of the groove decreases as described above.

For example, when the ratio of the height of the protrusions to the depth of the groove is more than 0.2, the height of the protrusions is too high with respect to the depth of the groove, and there is a fear that, when protrusions are to be molded, molding defects such as underfilling may occur. However, the ratio of the height of the protrusions to the depth of the groove is 0.2 or less, and hence occurrence of molding defects such as underfilling in the protrusions is suppressed. With this, as described above, light incident on the inside of the groove is applied onto the protrusion and changed in the reflection direction. Then, the amount of light emitted to the outside of the groove decreases.

As a result, as compared with a case where the brightness of the tread surface and the brightness of the bottom surface of the groove are the same, the contrast between the tread surface and the bottom surface of the groove is stronger, and it is possible to suppress an unused tire from giving an impression like a worn tire.

A tire according to a second aspect has a feature that, in the tire according to the first aspect, the depth of the groove is from 2 mmmm to 25 mmmm.

According to the above configuration, the depth of the groove is from 2 mmmm to 25 mm.

Here, for example, when the depth of the groove is less than 2 mm, the edge of the tread surface becomes difficult to be caught (slides) on the road surface, so that there is a fear that traction performance decreases. However, since the depth of the groove 18 is 2 mm or more, a decrease in traction performance is suppressed.

For example, when the depth of the groove is more than 25 mm, the depth of the groove is large, so that the amount of light incident on the inside of the groove, reflected on the bottom surface of the groove, and emitted to the outside of the groove is small. However, since the depth of the groove of the tire is 25 mm or less, the amount of light incident on the inside of the groove, reflected on the bottom surface of the groove, and emitted to the outside of the groove is not small. Here, since the plurality of protrusions protrude from the bottom surface of the groove at the height and interval described above, even if the depth of the groove is 25 mm or less, the amount of light incident on the inside of the groove, reflected on the bottom surface of the groove, and emitted to the outside of the groove decreases.

For this reason, it is possible to effectively suppress an unused tire from giving an impression like a worn tire, as compared with the case where the brightness of the tread surface and the brightness of the bottom surface of the groove are the same.

A tire according to a third aspect has a feature that, in the tire according to the first aspect or the second aspect, the groove includes a pair of side surfaces, the bottom surface, and a pair of curved surfaces connecting the side surfaces and the bottom surface, and the tire further includes a plurality of other protrusions that protrude from the side surfaces and the curved surfaces at a height of from 0.1 mm to 1.0 mm and are arranged at an interval of from more than 0.1 mm to 1.0 mm.

According to the above configuration, the plurality of other protrusions protrude from the side surfaces and the curved surfaces. A height of the other protrusions is from 0.1 mm to 1.0 mm, and the plurality of other protrusions are arranged at an interval of from more than 0.1 mm to 1.0 mm. Therefore, the contrast between the tread surface and the side surfaces, the curved surfaces, and the bottom surface of the groove is stronger. With this, it is possible to effectively suppress an unused tire from giving an impression like a worn tire as compared with the case where the protrusions are formed only on the bottom surface.

A tire according to a fourth aspect has a feature that, in the tire according to the third aspect, the height of the protrusions formed on the bottom surface, the height of the other protrusions formed on the curved surfaces, and the height of the other protrusions formed on the side surfaces decrease in this order.

According to the above configuration, the height of the protrusion formed on the bottom surface, the height of the other protrusion formed on the curved surface, and the height of the other protrusion formed on the side surface decrease in this order. For this reason, the amount of light incident on the inside of the groove, applied onto the protrusion or the other protrusion to be changed in the reflection direction, and emitted to the outside of the groove increases in the order of the bottom surface, the curved surfaces, and the side surfaces. With this, the brightness increases in the order of the bottom surface, the curved surfaces, the side surfaces, and the tread surface. As described above, since the brightness changes stepwise (gradually), it is possible to suppress the groove from giving a sense of incongruity as compared with the case where only a portion where the brightness is high and a portion where the brightness is low exist.

A tire according to a fifth aspect has a feature that, in the tire according to the third aspect, the interval of the protrusions formed on the bottom surface, the interval of the other protrusions formed on the curved surfaces, and the interval of the other protrusions formed on the side surfaces increase in this order.

According to the above configuration, the interval of the protrusion formed on the bottom surface, the interval of the other protrusion formed on the curved surface, and the interval of the other protrusion formed on the side surface increase in this order. For this reason, the amount of light incident on the inside of the groove, applied onto the protrusion or the other protrusion to be changed in the reflection direction, and emitted to the outside of the groove increases in the order of the bottom surface, the curved surfaces, and the side surfaces. With this, the brightness increases in the order of the bottom surface, the curved surfaces, the side surfaces, and the tread surface. As described above, since the brightness changes stepwise (gradually), it is possible to suppress the groove from giving a sense of incongruity as compared with the case where only a portion where the brightness is high and a portion where the brightness is low exist.

A tire according to a sixth aspect has a feature that, in the tire according to any one of the third aspect to the fifth aspect, the other protrusions formed on the side surfaces are arranged on portions of the side surfaces at the curved surface sides of the side surfaces.

According to the above configuration, the other protrusions formed on the side surfaces are arranged on portions of the side surfaces at the curved surface sides of the side surfaces. Therefore, as compared with the case where other protrusions are formed on the entire side surface of the groove, even when the tread surface is worn, the area where the other protrusions are formed is suppressed from becoming narrower. With this, the appearance of the groove can be suppressed from changing.

Advantageous Effects of Invention

According to the disclosure, it is possible to suppress an unused tire from giving an impression like a worn tire as compared with a case where the brightness of the tread surface and the brightness of the bottom surface of the groove are the same.

DESCRIPTION OF EMBODIMENTS

First Embodiment

An example of a tire according to a first embodiment of the present disclosure will be described with reference to FIG. 1 to FIG. 8. The arrow C shown in the figure indicates a tire circumferential direction, the arrow R indicates a tire radial direction, and the arrow W indicates a tire width direction.

Figure 2:
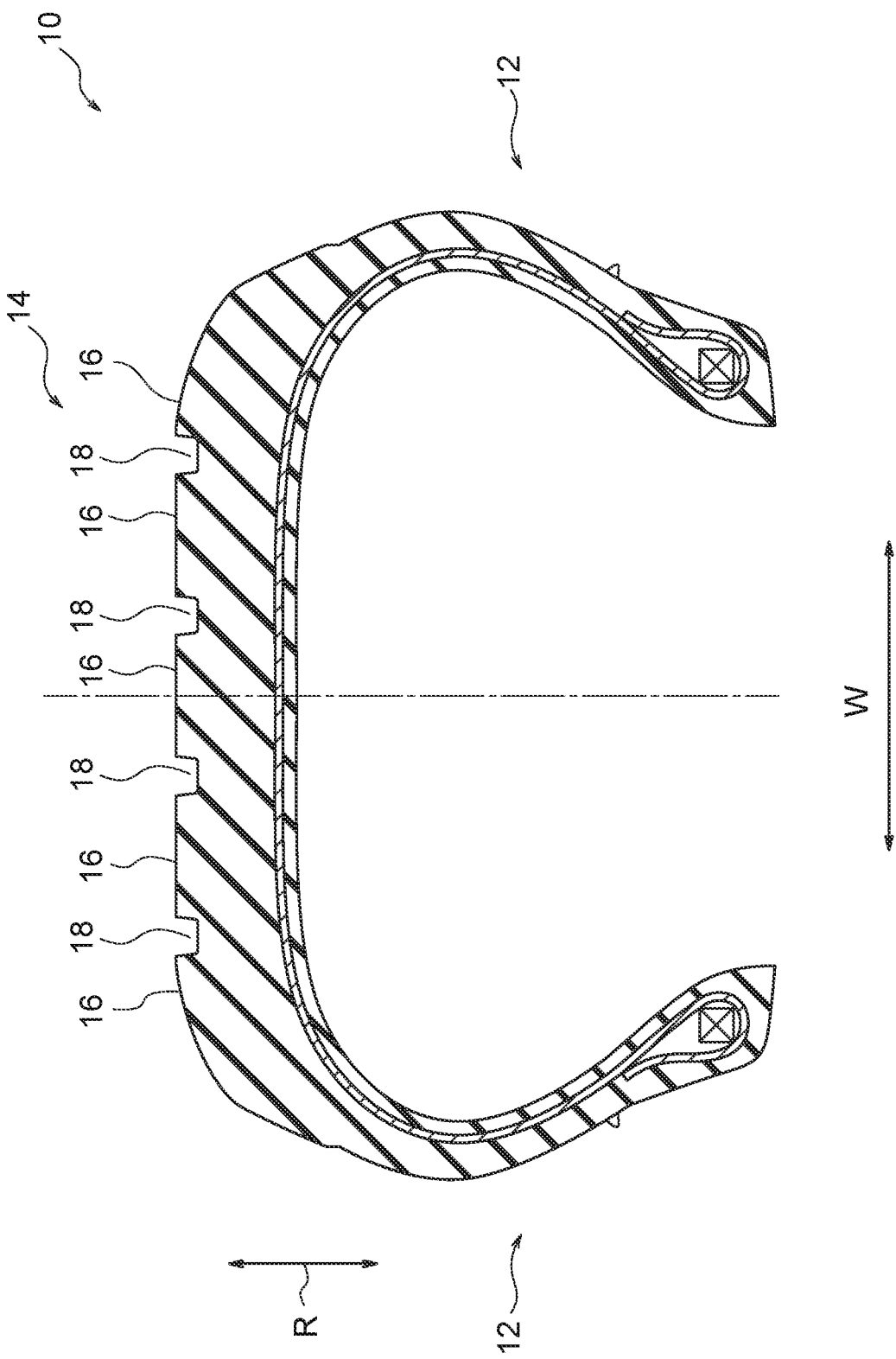
FIG. 2 is a cross-sectional view showing the tire according to the first embodiment of the disclosure.

As shown in FIG. 2, a tire 10 includes a pair of sidewall portions 12 that faces outward in the tire width direction, and a tread portion 14 that annularly extends in the tire circumferential direction so as to straddle the sidewall portions 12 and faces outward in the tire radial direction (side opposite to the axis of the tire). The tread portion 14 includes a tread surface 16 that contacts a road surface, and a plurality of grooves 18 that partition the tread surface 16 into a plurality.

Figure 1:
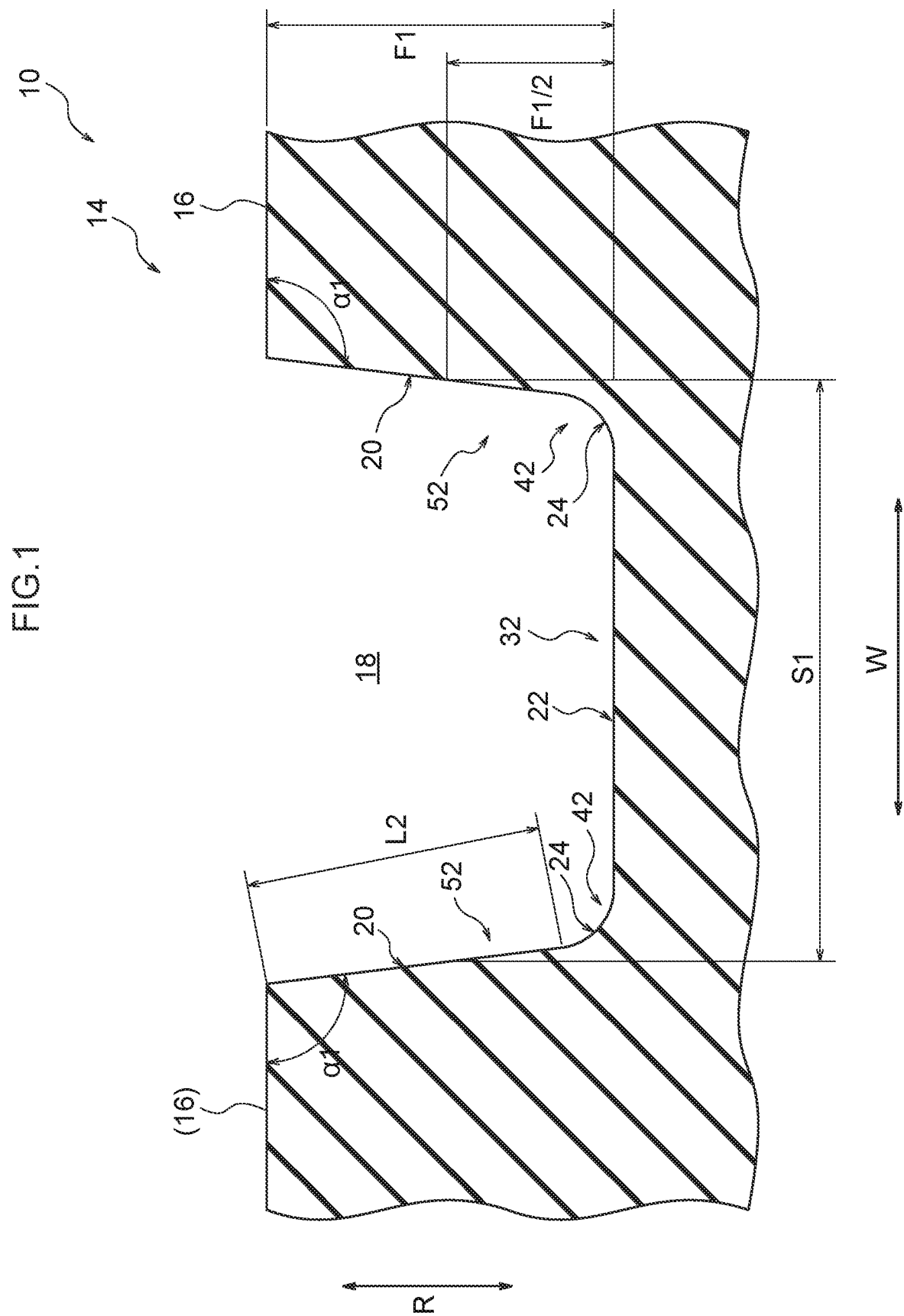
FIG. 1 is a cross-sectional view showing a groove formed in a tread portion of a tire according to a first embodiment of the present disclosure.

As shown in FIG. 1, the groove 18 is formed by a pair of side surfaces 20 opposed to each other in the tire width direction, a bottom surface 22 facing outward in the tire radial direction, and curved surfaces 24 connecting the pair of side surfaces 20 and the bottom surface 22. The depth of the groove 18 is from 2 mm to 25 mm. A ratio of a groove width S1 of the groove 18 to a groove depth F1 (groove width S1/groove depth F1) is 1.0±10%. The groove width S1 is a value at a position where the groove depth is F1/2. The angle formed between the side surface 20 of the groove 18 and the tread surface 16 (hereinafter referred to as "groove wall angle", $\alpha1$ in FIG. 1) is 100 [degrees]±10%.

As will be described later in detail, the bottom surface 22 is a first low brightness region 32 having a lower brightness than the tread surface 16. The curved surface 24 is a second low brightness region 42 having a lower brightness than the tread surface 16 and having a higher brightness than the first low brightness region 32. A portion of the side surface 20 on the curved surface 24 side is a third low brightness region 52 having a lower brightness than the tread surface 16 and having a higher brightness than the second low brightness region 42.

Incidentally, in a mold (die) for molding the tire 10, by providing irregularities in portions corresponding to the first low brightness region 32, the second low brightness region 42, and the third low brightness region 52, protrusions which will be described later are formed, and the first low brightness region 32, the second low brightness region 42, and the third low brightness region 52 are formed.

(First Low Brightness Region 32)

Figure 6:
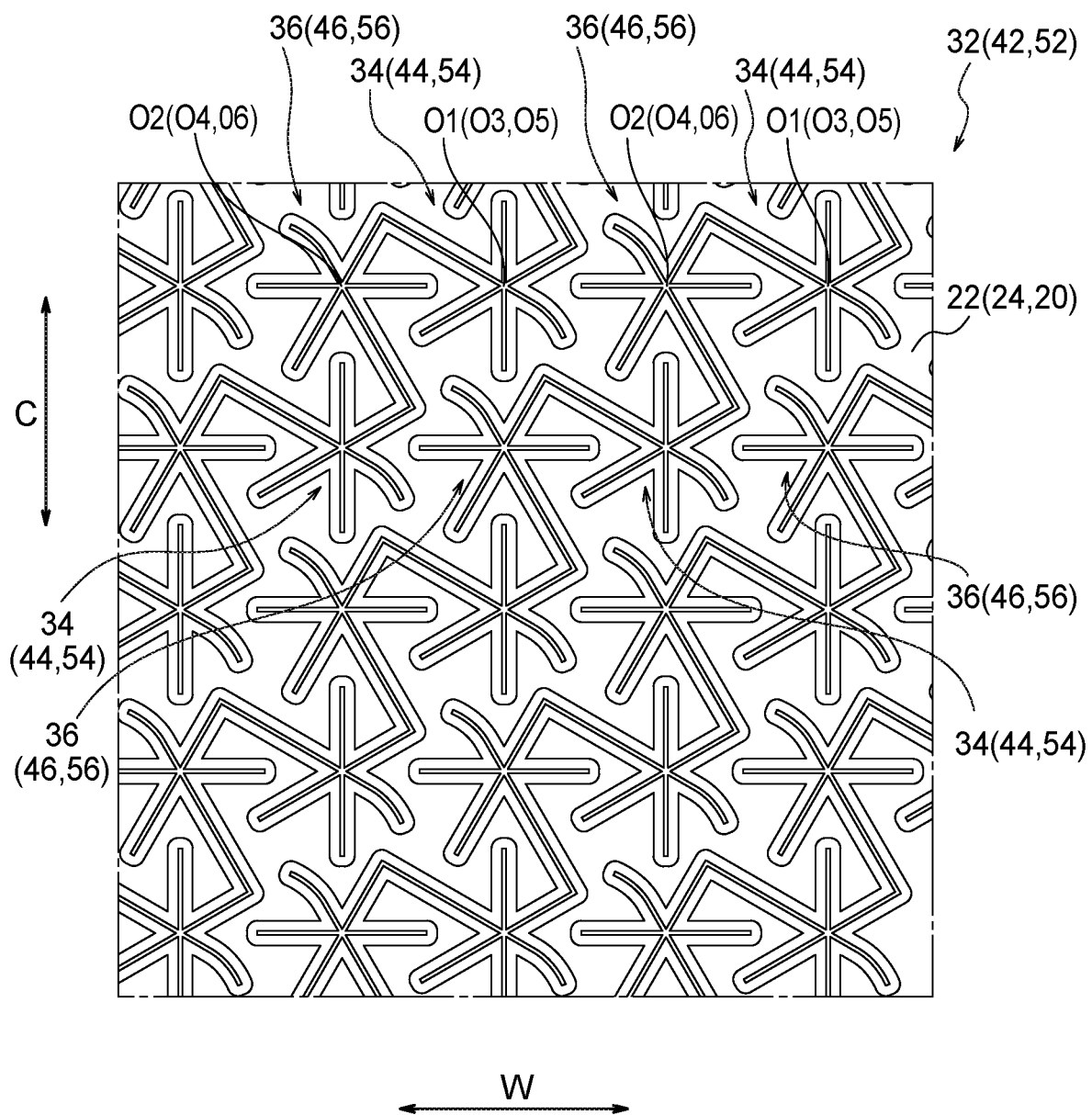
FIG. 6 is a plan view showing the protrusions formed on the groove of the tire according to the first embodiment of the disclosure.

As shown in FIG. 6, the first low brightness region 32 includes a plurality of first asterisk protrusions 34 and a plurality of second asterisk protrusions 36 that protrude from the bottom surface 22. The first asterisk protrusions 34 and the second asterisk protrusions 36 are arranged alternately in the tire circumferential direction and the tire width direction. The first asterisk protrusion 34 and the second asterisk protrusion 36 are examples of protrusions.

[First Asterisk Protrusion 34]

Figure 3:
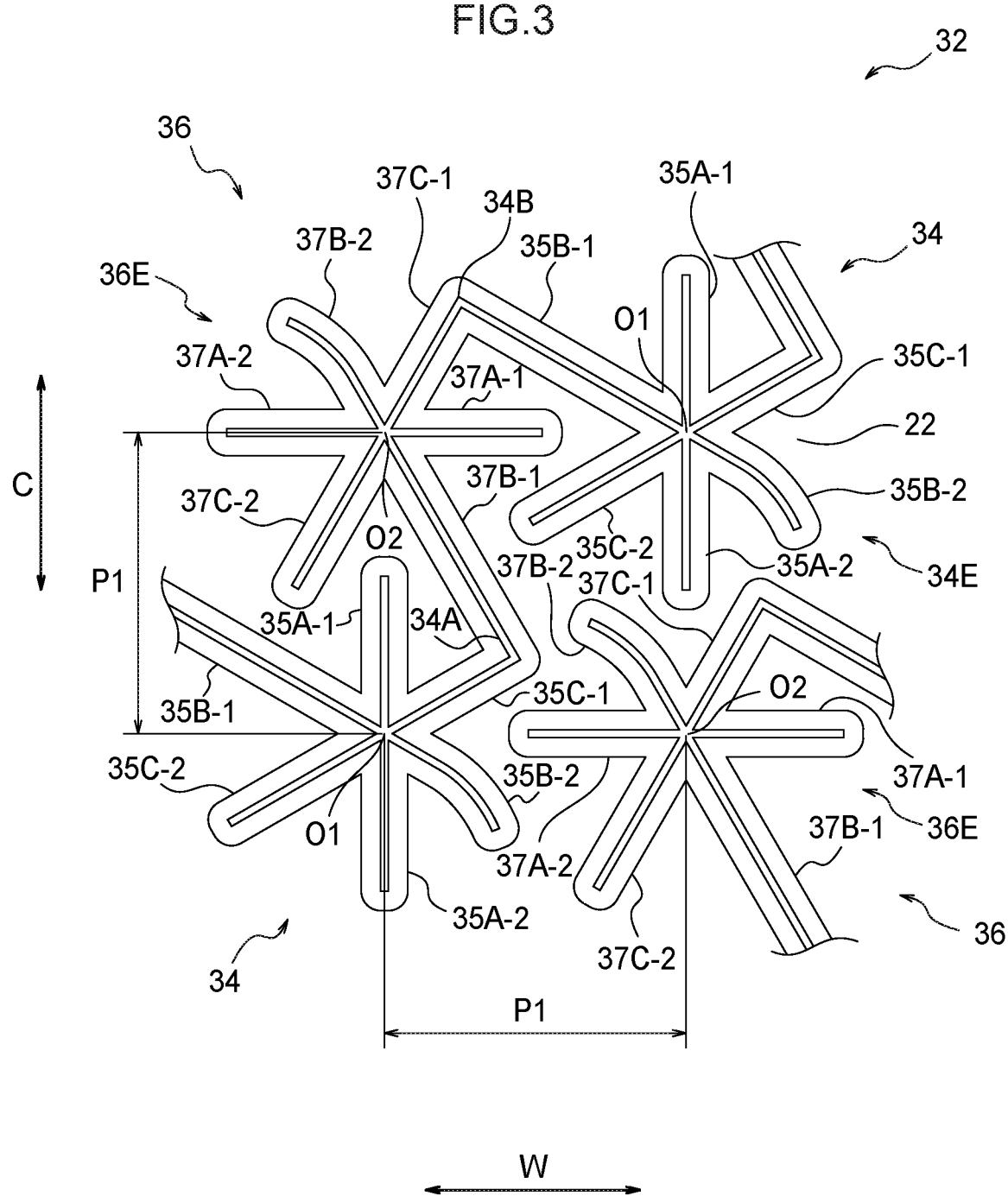
FIG. 3 is an enlarged plan view showing protrusions formed in a first low brightness region of the groove of the tire according to the first embodiment of the disclosure.

As shown in FIG. 3, the first asterisk protrusion 34 includes first extending portions 35A-1 and 35A-2, second extending portions 35B-1 and 35B-2, and third extending portions 35C-1 and 35C-2 that are extended in different directions from a center O1 as a base point, as viewed from a direction orthogonal to the bottom surface 22 (for example, the tire radial direction). Hereinafter, these six extending portions are collectively referred to as "extending portion 34E". One extending portion 34E and another extending portion 34E (excluding those extended in opposite directions from the center O1) form a linear shape bent at the center O1.

The first extending portion 35A-1 and the first extending portion 35A-2 are extended from the center O1 in opposite directions, and a linearly continuous shape is formed by the first extending portion 35A-1 and the first extending portion 35A-2. The first extending portion 35A-1 extends from the center O1 to one side in the tire circumferential direction (upper side in the figure), and the first extending portion 35A-2 extends from the center O1 to the other side in the tire circumferential direction (lower side in the figure). The first extending portion 35A-1 and the first extending portion 35A-2 have the same length. Hereinafter, the first extending portion 35A-1 and the first extending portion 35A-2 are collectively referred to as "first extending portion 35A".

The second extending portion 35B-1 and the second extending portion 35B-2 are extended from the center O1 in opposite directions, and a linearly continuous shape is formed by the second extending portion 35B-1 and the second extending portion 35B-2. The second extending portion 35B-1 and the second extending portion 35B-2 are inclined with respect to the tire width direction so that an end portion on one side in the tire width direction (left side in the figure) is located on one side in the tire circumferential direction (upper side in the figure) as compared with an end portion on the other side in tire width direction (right side in the figure).

The second extending portion 35B-1 extends from the center O1 to one side in the tire width direction, and the second extending portion 35B-2 extends from the center O1 to the other side in the tire width direction. The second extending portion 35B-1 is longer than the second extending portion 35B-2. A portion on the distal end side of the second extending portion 35B-2 is curved to the other side in the tire circumferential direction. Hereinafter, the second extending portion 35B-1 and the second extending portion 35B-2 are collectively referred to as "second extending portion 35B".

The third extending portion 35C-1 and the third extending portion 35C-2 are extended from the center O1 in opposite directions, and a linearly continuous shape is formed by the third extending portion 35C-1 and the third extending portion 35C-2. The third extending portion 35C-1 and the third extending portion 35C-2 are inclined with respect to the tire width direction so that an end portion on one side in the tire width direction (left side in the figure) is located on the other side in the tire circumferential direction (lower side in the figure) as compared with an end portion on the other side in tire width direction (right side in the figure).

The third extending portion 35C-1 extends from the center O1 to the other side in the tire width direction, and the third extending portion 35C-2 extends from the center O1 to one side in the tire width direction. The third extending portion 35C-1 is shorter than the third extending portion 35C-2. Hereinafter, the third extending portion 35C-1 and the third extending portion 35C-2 are collectively referred to as "third extending portion 35C".

Each of the six extending portions 34E forms an angle of 60° with the adjacent extending portion 34E. In other words, the first asterisk protrusion 34 has a shape in which the six extending portions 34E are radially extended from the center O1.

Figure 7A:
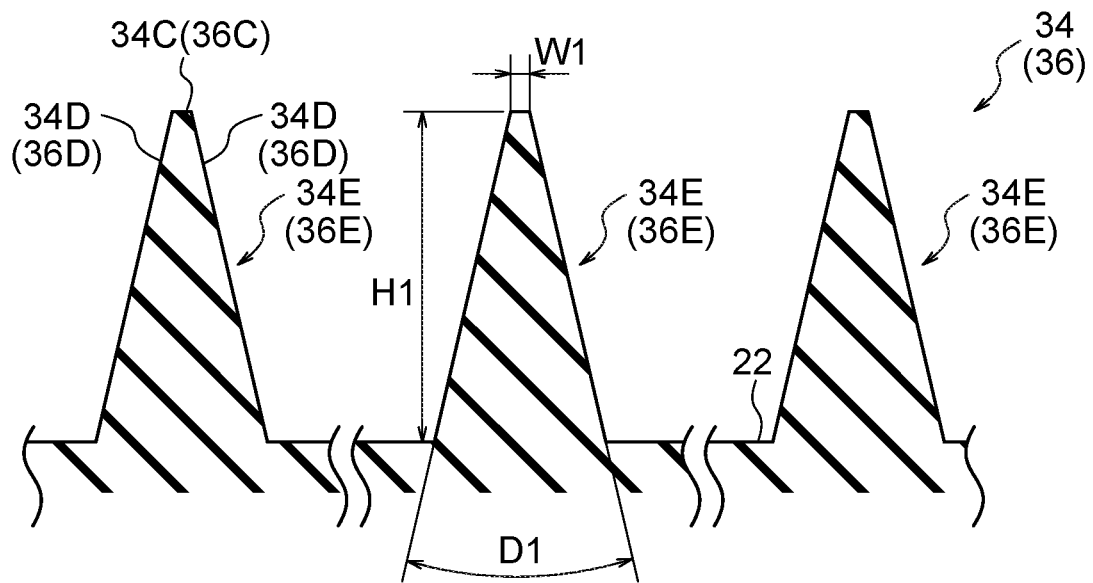
FIG. 7A is a cross-sectional view showing the protrusions formed on the groove of the tire according to the first embodiment of the disclosure.

As shown in FIG. 7A, in the extending portion 34E of the first asterisk protrusion 34, a cross section in a direction orthogonal to the extending direction is a substantially isosceles triangular shape having a flat top surface 34C. That is, the first asterisk protrusion 34 has the top surface 34C and a pair of side surfaces 34D. In the present embodiment, a width of the top surface 34C (W1 in the figure) is 0.02 mm, and an apex angle of the first asterisk protrusion 34 (D1 in the figure) is 26 [degrees].

The height of the first asterisk protrusion 34 (H1 in the figure) is from 0.1 mm to 1.0 mm, and is one predetermined value where the ratio of the height of the first asterisk protrusion 34 to the depth of the groove 18 (protrusion height/groove depth) is from 0.02 to 0.2. In the present embodiment, the height of the first asterisk protrusion 34 (H1 in the figure) is 0.8 mm as an example. When the height of the protrusion is less than 0.1 mm, it is difficult to form the protrusion, and there is a fear that it is not possible to attenuate the incident light to lower the brightness to an intended level (details will be described later).

By setting the height of the protrusion to 1.0 mm or less, the difference between the rigidity of the portion where the protrusion is formed and the rigidity of the portion around the protrusion where the protrusion is not formed is reduced, and the local stress concentration is suppressed.

The dimensions such as the groove width of the groove 18, the groove depth of the groove 18, the height of the protrusion, and a distance (pitch) between the protrusions to be described later in the present embodiment can be measured using the VR-3000 series of one-shot 3D measuring macroscope of Keyence Corporation as an example.

[Second Asterisk Protrusion 36]

As shown in FIG. 3, the second asterisk protrusion 36 has the same shape as the first asterisk protrusion 34. Specifically, the second asterisk protrusion 36 has a shape obtained by rotating the first asterisk protrusion 34 clockwise about the center O1 by 90 [degrees], and turning the first asterisk protrusion 34 rotated by 90 [degrees] about the center O1 upside down, as viewed from the direction orthogonal to the bottom surface 22.

In the second asterisk protrusion 36, portions corresponding to the first extending portions 35A-1 and 35A-2, the second extending portions 35B-1 and 35B-2, the third extending portions 35C-1 and 35C-2, and the center O1 of the first asterisk protrusion 34 are referred to as first extending portions 37A-1 and 37A-2, second extending portions 37B-1 and 37B-2, third extending portions 37C-1 and 37C-2, and a center O2. Hereinafter, the above-mentioned six extending portions are collectively referred to as "extending portion 36E".

In the second asterisk protrusion 36, a portion corresponding to the top surface 34C of the first asterisk protrusion 34 is referred to as a top surface 36C. In the second asterisk protrusion 36, portions corresponding to the side surfaces 34D of the first asterisk protrusion 34 are referred to as side surfaces 36D (see FIG. 7A).

[Others]

As shown in FIG. 3 and FIG. 6, the first asterisk protrusions 34 and the second asterisk protrusions 36 are arranged alternately in the tire circumferential direction and the tire width direction, and cover the entire first low brightness region 32 (see FIG. 1).

The respective distal ends of the first extending portions 35A-1 and 35A-2 of the first asterisk protrusion 34 are respectively inserted between the second extending portion 37B-2 and the third extending portion 37C-1 of the second asterisk protrusions 36 adjacent in the tire circumferential direction and between the second extending portion 37B-1 and the third extending portion 37C-2 of the second asterisk protrusions 36 adjacent in the tire circumferential direction. The respective distal ends of the first extending portions 37A-1 and 37A-2 of the second asterisk protrusion 36 are respectively inserted between the second extending portion 35B-1 and the third extending portion 35C-2 of the first asterisk protrusions 34 adjacent in the tire width direction and between the second extending portion 35B-2 and the third extending portion 35C-1 of the first asterisk protrusions 34 adjacent in the tire width direction.

The distal end of the third extending portion 35C-1 of the first asterisk protrusion 34 and the distal end of the second extending portion 37B-1 of the second asterisk protrusion 36 arranged on one side in the tire circumferential direction with respect to the first asterisk protrusion 34 are coupled to each other. With this, a coupling portion 34A is formed. The distal end of the second extending portion 35B-1 of the first asterisk protrusion 34 and the distal end of the third extending portion 37C-1 of the second asterisk protrusion 36 arranged on one side in the tire width direction with respect to the first asterisk protrusion 34 are coupled to each other. With this, a coupling portion 34B is formed.

In this configuration, the first asterisk protrusions 34 and the second asterisk protrusions 36 are coupled in a stepwise manner from the other side to one side in the tire circumferential direction via the coupling portions 34A and 34B.

In the first asterisk protrusions 34 and the second asterisk protrusions 36 adjacent in the tire circumferential direction and the tire width direction, an interval between the center O1 and the center O2 (hereinafter, referred to as "interval P1") is one predetermined value of from more than 0.1 mm to 1.0 mm. When the interval P1 is 0.1 mm or less, it is difficult to form the protrusions. When the interval P1 is more than 1.0 mm, there is a fear that it is not possible to attenuate the incident light to lower the brightness to an intended level (details will be described later).

Here, the first low brightness region 32 described in the present embodiment is a region where the value of the brightness L* measured using a handy spectrophotometer (NF333) of Nippon Denshoku Industries Co., Ltd. is 10 or less as an example.

(Second Low Brightness Region 42)

Figure 4:
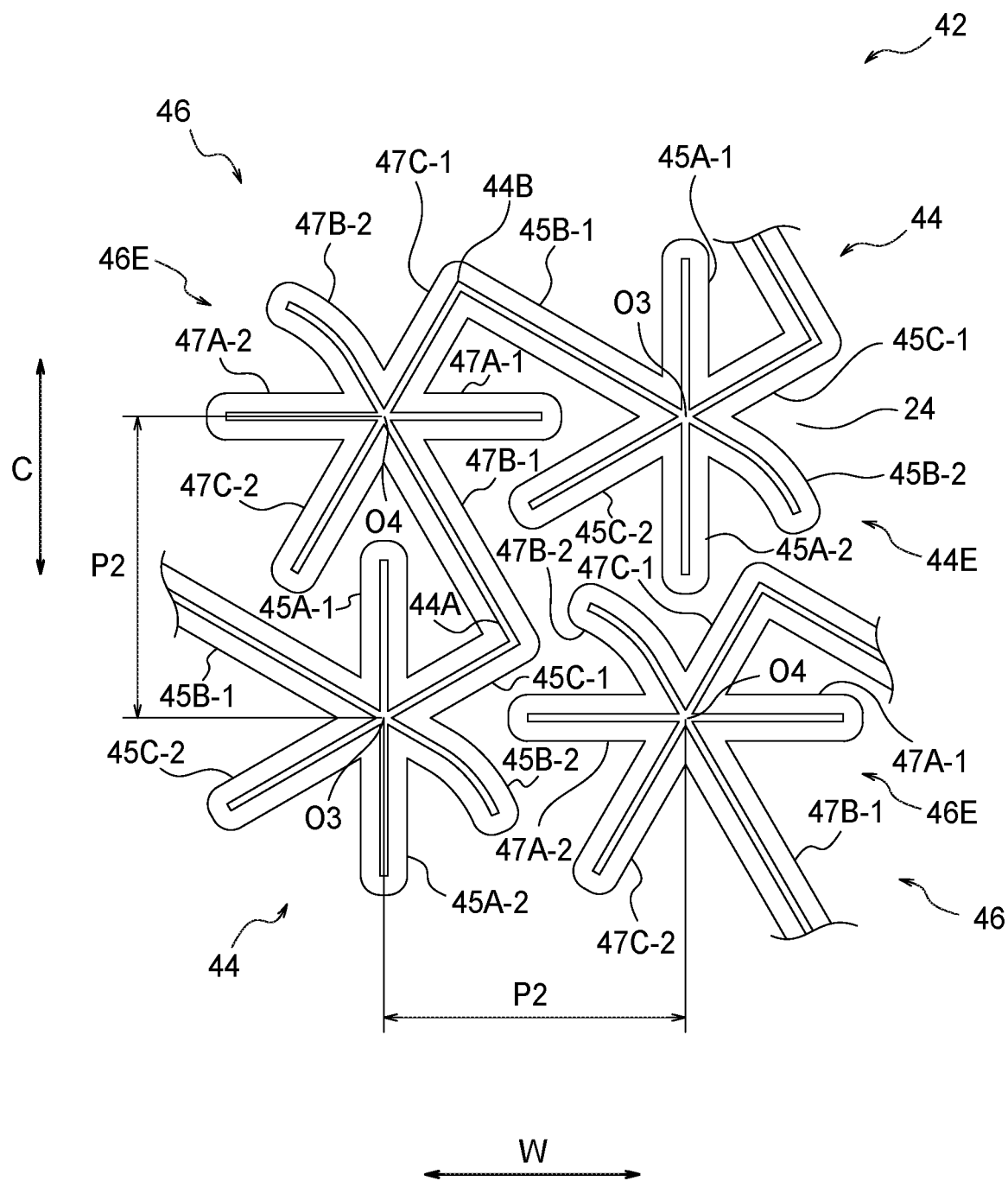
FIG. 4 is an enlarged plan view showing protrusions formed in a second low brightness region of the groove of the tire according to the first embodiment of the disclosure.

As shown in FIG. 4, the second low brightness region 42 includes a plurality of first asterisk protrusions 44 and a plurality of second asterisk protrusions 46 that protrude from the curved surface 24. The first asterisk protrusions 44 and the second asterisk protrusions 46 are arranged alternately in the tire circumferential direction and the tire width direction. The first asterisk protrusion 44 and the second asterisk protrusion 46 are examples of other protrusions.

[First Asterisk Protrusion 44]

Regarding the first asterisk protrusion 44, portions different from the first asterisk protrusion 34 (see FIG. 3) of the first low brightness region 32 will be mainly described.

As shown in FIG. 4, the first asterisk protrusion 44 has a shape similar to that of the first asterisk protrusion 34 (see FIG. 3) of the first low brightness region 32 as viewed from a direction orthogonal to the curved surface 24. In the first asterisk protrusion 44, portions corresponding to the first extending portions 35A-1 and 35A-2, the second extending portions 35B-1 and 35B-2, the third extending portions 35C-1 and 35C-2, and the center O1 of the first asterisk protrusion 34 are referred to as first extending portions 45A-1 and 45A-2, second extending portions 45B-1 and 45B-2, third extending portions 45C-1 and 45C-2, and a center O3. Hereinafter, the above-mentioned six extending portions are collectively referred to as "extending portion 44E".

Figure 7B:
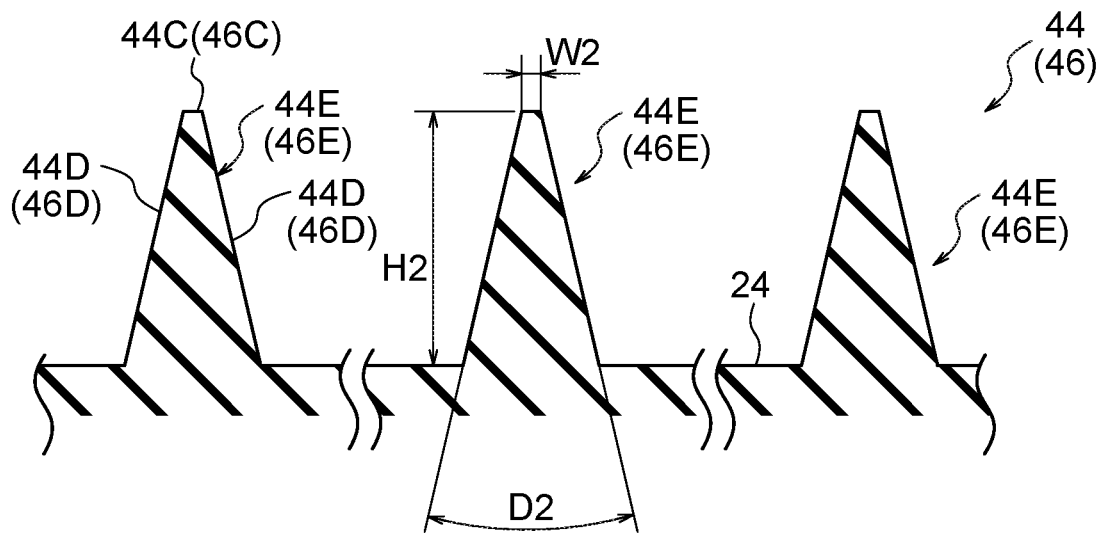
FIG. 7B is a cross-sectional view showing the protrusions formed on the groove of the tire according to the first embodiment of the disclosure.

As shown in FIG. 7B, in the extending portion 44E of the first asterisk protrusion 44, a cross section in a direction orthogonal to the extending direction is a substantially isosceles triangular shape having a flat top surface 44C. That is, the first asterisk protrusion 44 has the top surface 44C and a pair of side surfaces 44D. In the present embodiment, a width of the top surface 44C (W2 in the figure) is 0.02 mm, and an apex angle of the first asterisk protrusion 44 (D2 in the figure) is 26 [degrees].

The height of the first asterisk protrusion 44 (H2 in the figure) is from 0.1 mm to 1.0 mm, and is one predetermined value where the ratio of the height of the first asterisk protrusion 44 to the depth of the groove 18 (protrusion height/groove depth) is from 0.02 to 0.2. In the present embodiment, the height of the first asterisk protrusion 44 (H2 in the figure) is 0.6 mm as an example.

[Second Asterisk Protrusion 46]

As shown in FIG. 4, the second asterisk protrusion 46 has the same shape as the first asterisk protrusion 44. Specifically, the second asterisk protrusion 46 has a shape obtained by rotating the first asterisk protrusion 44 clockwise about the center O3 by 90 [degrees], and turning the first asterisk protrusion 44 rotated by 90 [degrees] about the center O3 upside down, as viewed from a direction orthogonal to the curved surface 24.

In the second asterisk protrusion 46, portions corresponding to the first extending portions 45A-1 and 45A-2, the second extending portions 45B-1 and 45B-2, the third extending portions 45C-1 and 45C-2, and the center O3 of the first asterisk protrusion 44 are referred to as first extending portions 47A-1 and 47A-2, second extending portions 47B-1 and 47B-2, third extending portions 47C-1 and 47C-2, and a center O4. Hereinafter, the above-mentioned six extending portions are collectively referred to as "extending portion 46E".

In the second asterisk protrusion 46, a portion corresponding to the top surface 44C of the first asterisk protrusion 44 is referred to as a top surface 46C. In the second asterisk protrusion 46, portions corresponding to the side surfaces 44D of the first asterisk protrusion 44 are referred to as side surfaces 46D (see FIG. 7B).

[Others]

As shown in FIG. 4, the first asterisk protrusions 44 and the second asterisk protrusions 46 are arranged alternately in the tire circumferential direction and the tire width direction, and cover the entire second low brightness region 42 (see FIG. 1).

The respective distal ends of the first extending portions 45A-1 and 45A-2 of the first asterisk protrusion 44 are respectively inserted between the second extending portion 47B-2 and the third extending portion 47C-1 of the second asterisk protrusions 46 adjacent in the tire circumferential direction and between the second extending portion 47B-1 and the third extending portion 47C-2 of the second asterisk protrusions 46 adjacent in the tire circumferential direction. The respective distal ends of the first extending portions 47A-1 and 47A-2 of the second asterisk protrusion 46 are inserted between the second extending portion 45B-1 and the third extending portion 45C-2 of the first asterisk protrusions 44 adjacent in the tire width direction and between the second extending portion 45B-2 and the third extending portion 45C-1 of the first asterisk protrusions 44 adjacent in the tire width direction.

The distal end of the third extending portion 45C-1 of the first asterisk protrusion 44 and the distal end of the second extending portion 47B-1 of the second asterisk protrusion 46 arranged on one side in the tire circumferential direction with respect to the first asterisk protrusion 44 are coupled to each other. With this, a coupling portion 44A is formed. The distal end of the second extending portion 45B-1 of the first asterisk protrusion 44 and the distal end of the third extending portion 47C-1 of the second asterisk protrusion 46 arranged on one side in the tire width direction with respect to the first asterisk protrusion 44 are coupled to each other. With this, a coupling portion 44B is formed.

In this configuration, the first asterisk protrusions 44 and the second asterisk protrusions 46 are coupled in a stepwise manner from the other side to one side in the tire circumferential direction via the coupling portions 44A and 44B.

In the first asterisk protrusions 44 and the second asterisk protrusions 46 adjacent in the tire circumferential direction and the tire width direction, an interval between the center O3 and the center O4 (hereinafter, referred to as "interval P2") is the same value as the above-described interval P1. The interval P2 is a distance along the curved surface 24.

Here, the second low brightness region 42 described in the present embodiment is a region where the value of the brightness L* measured using a handy spectrophotometer (NF333) of Nippon Denshoku Industries Co., Ltd. is from more than 10 to 12 as an example.

(Third Low Brightness Region 52)

Figure 5:
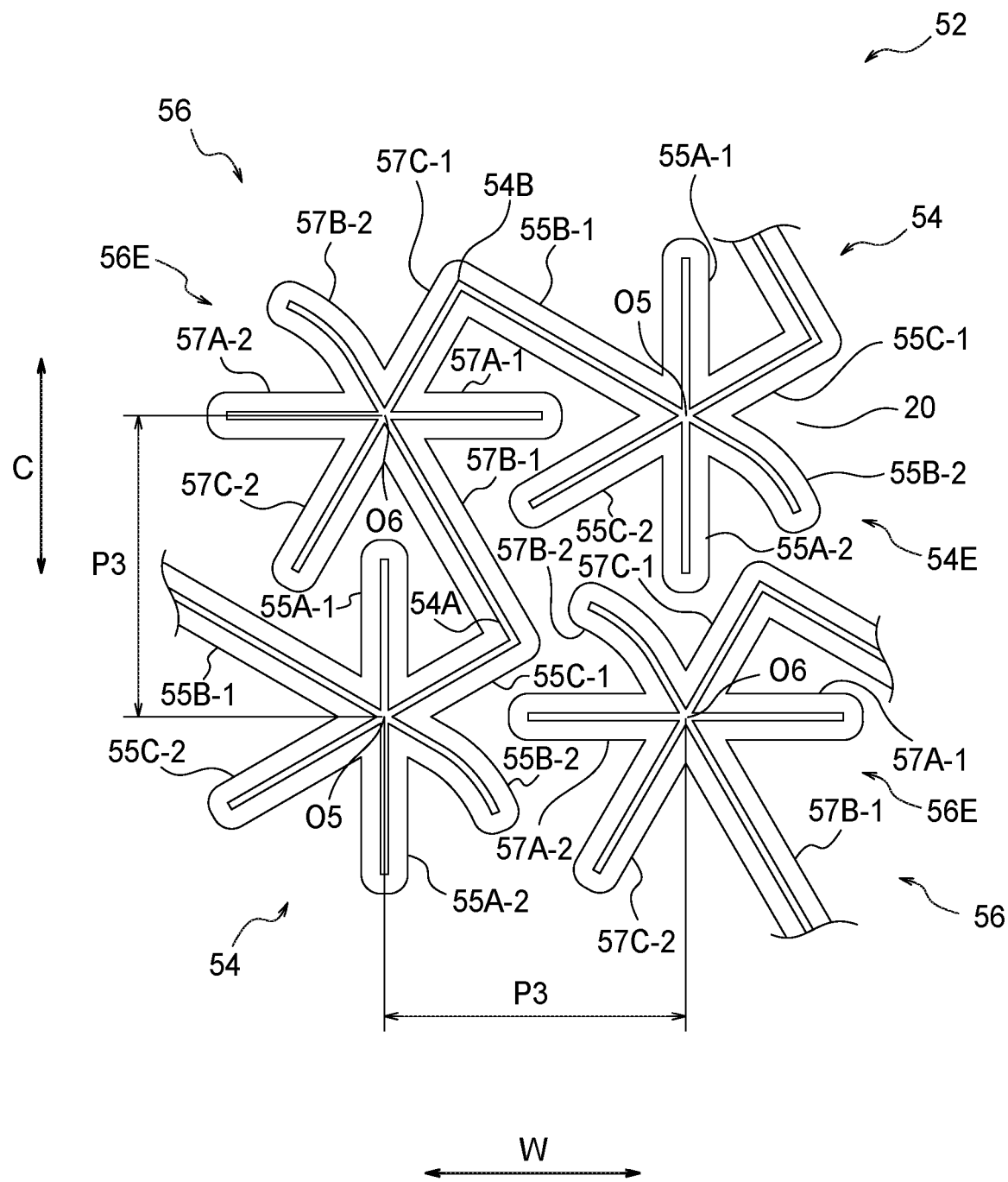
FIG. 5 is an enlarged plan view showing protrusions formed in a third low brightness region of the groove of the tire according to the first embodiment of the disclosure.

As shown in FIG. 5, the third low brightness region 52 includes a plurality of first asterisk protrusions 54 that protrude from a portion of the side surface 20 on the curved surface 24 side, and a plurality of second asterisk protrusions 56 that protrude from the portion of the side surface 20 on the curved surface 24 side. The first asterisk protrusions 54 and the second asterisk protrusions 56 are arranged alternately in the tire circumferential direction and the tire radial direction. The first asterisk protrusion 54 and the second asterisk protrusion 56 are examples of other protrusions.

In the present embodiment, the "portion of the side surface 20 on the curved surface 24 side" refers to a range of 5 from the lower end of the side surface 20 when the length of the side surface 20 in the groove depth direction (L2 in FIG. 1) is 10.

[First Asterisk Protrusion 54]

Regarding the first asterisk protrusion 54, portions different from the first asterisk protrusion 34 (see FIG. 3) of the first low brightness region 32 will be mainly described.

As shown in FIG. 5, the first asterisk protrusion 54 has a shape similar to that of the first asterisk protrusion 34 (see FIG. 3) of the first low brightness region 32 as viewed from a direction orthogonal to the side surface 20. In the first asterisk protrusion 54, portions corresponding to the first extending portions 35A-1 and 35A-2, the second extending portions 35B-1 and 35B-2, the third extending portions 35C-1 and 35C-2, and the center O1 of the first asterisk protrusion 34 are referred to as first extending portions 55A-1 and 55A-2, second extending portions 55B-1 and 55B-2, third extending portions 55C-1 and 55C-2, and a center O5. Hereinafter, the above-mentioned six extending portions are collectively referred to as "extending portion 54E".

Figure 7C:
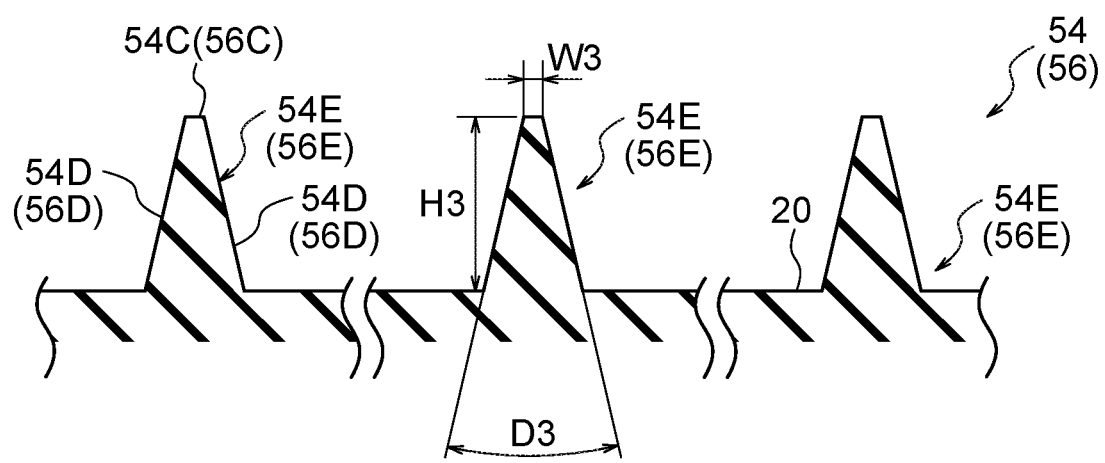
FIG. 7C is a cross-sectional view showing the protrusions formed on the groove of the tire according to the first embodiment of the disclosure.

As shown in FIG. 7C, in the extending portion 54E of the first asterisk protrusion 54, a cross section in a direction orthogonal to the extending direction is a substantially isosceles triangular shape having a flat top surface 54C. That is, the first asterisk protrusion 54 has the top surface 54C and a pair of side surfaces 54D. In the present embodiment, a width of the top surface 54C (W3 in the figure) is 0.02 mm, and an apex angle of the first asterisk protrusion 54 (D3 in the figure) is 26 [degrees].

The height of the first asterisk protrusion 54 (H3 in the figure) is from 0.1 mm to 1.0 mm, and is one predetermined value where the ratio of the height of the first asterisk protrusion 54 to the depth of the groove 18 (protrusion height/groove depth) is from 0.02 to 0.2. In the present embodiment, the height of the first asterisk protrusion 54 (H3 in the figure) is 0.4 mm as an example.

[Second Asterisk Protrusion 56]

As shown in FIG. 5, the second asterisk protrusion 56 has the same shape as the first asterisk protrusion 54. Specifically, the second asterisk protrusion 56 has a shape obtained by rotating the first asterisk protrusion 54 clockwise about the center O5 by 90 [degrees], and turning the first asterisk protrusion 54 rotated by 90 [degrees] about the center O3 upside down, as viewed from the direction orthogonal to the side surface 20.

In the second asterisk protrusion 56, portions corresponding to the first extending portions 55A-1 and 55A-2, the second extending portions 55B-1 and 55B-2, the third extending portions 55C-1 and 55C-2, and the center O5 of the first asterisk protrusion 54 are referred to as first extending portions 57A-1 and 57A-2, second extending portions 57B-1 and 57B-2, third extending portions 57C-1 and 57C-2, and a center O6. Hereinafter, the above-mentioned six extending portions are collectively referred to as "extending portion 56E".

In the second asterisk protrusion 56, a portion corresponding to the top surface 54C of the first asterisk protrusion 54 is referred to as a top surface 56C. In the second asterisk protrusion 56, portions corresponding to the side surfaces 54D of the first asterisk protrusion 54 are referred to as side surfaces 56D (see FIG. 7C).

[Others]

As shown in FIG. 5, the first asterisk protrusions 54 and the second asterisk protrusions 56 are arranged alternately in the tire circumferential direction and the tire radial direction, and cover the entire third low brightness region 52 (see FIG. 1).

The respective distal ends of the first extending portions 55A-1 and 55A-2 of the first asterisk protrusion 54 are respectively inserted between the second extending portion 57B-2 and the third extending portion 57C-1 of the second asterisk protrusions 56 adjacent in the tire circumferential direction and between the second extending portion 57B-1 and the third extending portion 57C-2 of the second asterisk protrusions 56 adjacent in the tire circumferential direction. The respective distal ends of the first extending portions 57A-1 and 57A-2 of the second asterisk protrusion 56 are inserted between the second extending portion 55B-1 and the third extending portion 55C-2 of the first asterisk protrusions 54 adjacent in the tire radial direction and between the second extending portion 55B-2 and the third extending portion 55C-1 of the first asterisk protrusions 54 adjacent in the tire radial direction.

The distal end of the third extending portion 55C-1 of the first asterisk protrusion 54 and the distal end of the second extending portion 57B-1 of the second asterisk protrusion 56 arranged on one side in the tire circumferential direction with respect to the first asterisk protrusion 54 are coupled to each other. With this, a coupling portion 54A is formed. The distal end of the second extending portion 55B-1 of the first asterisk protrusion 54 and the distal end of the third extending portion 57C-1 of the second asterisk protrusion 56 arranged on the outer side in the tire radial direction with respect to the first asterisk protrusion 54 are coupled to each other. With this, a coupling portion 54B is formed.

In this configuration, the first asterisk protrusions 54 and the second asterisk protrusions 56 are coupled in a stepwise manner from the other side to one side in the tire circumferential direction via the coupling portions 54A and 54B.

In the first asterisk protrusions 54 and the second asterisk protrusions 56 adjacent in the tire circumferential direction and the tire radial direction, an interval between the center O5 and the center O6 (hereinafter, referred to as "interval P3") is the same value as the above-described interval P1.

Here, the second low brightness region 42 described in the present embodiment is a region where the value of the brightness L* measured using a handy spectrophotometer (NF333) of Nippon Denshoku Industries Co., Ltd. is from more than 12 to 14 as an example. In the tread portion 14 of the tire 10, the tread surface 16, and the region of the side surface 20 on the tread surface 16 side where no protrusion is formed are regions where the value of the brightness L* measured using a handy spectrophotometer (NF333) of Nippon Denshoku Industries Co., Ltd. is more than 20 as an example.

(Actions)

Next, actions of the tire according to the present embodiment will be described.

In the first low brightness region 32 of the bottom surface 22 in the groove 18 of the tread portion 14 shown in FIG. 1, light incident on the first asterisk protrusion 34 and the second asterisk protrusion 36 formed in the first low brightness region 32 is applied onto the side surfaces 34D and 36D shown in FIG. 7A. Then, the incident light is attenuated while being repeatedly reflected between the facing side surfaces 34D and 36D, and is emitted to the outside of the groove 18. In this manner, the amount of light incident on the inside of the groove 18 and emitted to the outside of the groove 18 decreases.

In the second low brightness region 42 of the curved surface 24 in the groove 18, light incident on the first asterisk protrusion 44 and the second asterisk protrusion 46 formed in the second low brightness region 42 is applied onto the side surfaces 44D and 46D shown in FIG. 7B. Then, the incident light is attenuated while being repeatedly reflected between the facing side surfaces 44D and 46D, and is emitted to the outside of the groove 18. In this manner, the amount of light incident on the inside of the groove 18 and emitted to the outside of the groove 18 decreases.

In the third low brightness region 52 on the portion of the side surface 20 of the groove 18 on the curved surface 24 side, light incident on the first asterisk protrusion 54 and the second asterisk protrusion 56 formed in the third low brightness region 52 is applied onto the side surfaces 54D and 56D shown in FIG. 7C. Then, the incident light is attenuated while being repeatedly reflected between the facing side surfaces 54D and 56D, and is emitted to the outside of the groove 18. In this manner, the amount of light incident on the inside of the groove 18 and emitted to the outside of the groove 18 decreases.

In the region of the side surface 20 on the tread surface 16 side where no protrusion is formed, light from the outside is applied onto a flat surface on which no protrusion is formed and is reflected, and is emitted to the outside of the groove 18.

Regarding the tread surface 16, light from the outside is applied onto a flat surface on which no protrusion is formed and is reflected.

Here, the heights of the first asterisk protrusion 34 and the second asterisk protrusion 36 formed in the first low brightness region 32 are set to 0.8 mm. The heights of the first asterisk protrusion 44 and the second asterisk protrusion 46 formed in the second low brightness region 42 are 0.6 mm. The heights of the first asterisk protrusion 54 and the second asterisk protrusion 56 formed in the third low brightness region 52 is 0.4 mm.

Since the intervals P1, P2, and P3 of the respective protrusions have the same value, the ratio of the curved surface 24 of the second low brightness region 42 per unit area is larger the ratio of the bottom surface 22 of the first low brightness region 32 per unit area. The ratio of the side surface 20 of the third low brightness region 52 per unit area is larger than the ratio of the curved surface 24 of the second low brightness region 42 per unit area.

With this, the amount of light emitted to the outside of the groove 18 in the second low brightness region 42 is larger than the amount of light emitted to the outside of the groove 18 in the first low brightness region 32. The amount of light emitted to the outside of the groove 18 in the third low brightness region 52 is larger than the amount of light emitted to the outside of the groove 18 in the second low brightness region 42. That is, the brightness L* increases in the order of the first low brightness region 32, the second low brightness region 42, the third low brightness region 52, and the tread surface 16.

SUMMARY

According to the above configuration, the ratio of the height of the first asterisk protrusion 34 and the second asterisk protrusion 36 to the depth of the groove 18 (protrusion height/groove depth) is from 0.02 to 0.2.

Here, for example, when the ratio of the height of the first asterisk protrusion 34 and the second asterisk protrusion 36 to the depth of the groove 18 is less than 0.02, the height of the protrusion is too low with respect to the depth of the groove 18. For this reason, the light incident on the inside of the groove 18 is applied onto the protrusion and changed in the reflection direction, but the amount of light emitted to the outside of the groove 18 does not sufficiently decrease. However, since the ratio of the height of the protrusion to the depth of the groove 18 is 0.02 or more, the amount of light emitted to the outside of the groove 18 decreases as described above.

For example, when the ratio of the height of the first asterisk protrusion 34 and the second asterisk protrusion 36 to the depth of the groove 18 is more than 0.2, the height of the protrusion is too high with respect to the depth of the groove 18, and there is a fear that, when protrusions are to be molded, molding defects such as underfilling may occur. However, the ratio of the height of the first asterisk protrusion 34 and the second asterisk protrusion 36 to the depth of the groove 18 is 0.2 or less, and hence occurrence of molding defects such as underfilling in the protrusions is suppressed. Accordingly, as described above, the light incident on the inside of the groove 18 is applied onto the first asterisk protrusion 34 and the second asterisk protrusion 36 and changed in the reflection direction. Then, the amount of light emitted to the outside of the groove 18 decreases.

In this way, by lowering the brightness L* of the first low brightness region 32 formed on the bottom surface 22 of the groove 18 with respect to the brightness L* of the tread surface 16, the contrast between the tread surface 16 and the bottom surface 22 of the groove 18 becomes stronger (identification between the tread surface 16 and the groove 18 becomes reliable) as compared with the case where the brightness L* of the tread surface and the brightness L* of the bottom surface are the same, and it is possible to suppress an unused tire from giving an impression like a worn tire.

The depth of the groove 18 is from 2 mm to 25 mm.

Here, for example, when the depth of the groove 18 is less than 2 mm, the edge of the tread surface 16 becomes difficult to be caught (slides) on the road surface, so that there is a fear that traction performance decreases. However, since the depth of the groove is 2 mm or more, a decrease in traction performance is suppressed.

For example, when the depth of the groove is more than 25 mm, the depth of the groove is large, so that the amount of light incident on the inside of the groove 18, reflected on the bottom surface 22 of the groove 18, and emitted to the outside of the groove 18 is small. However, since the depth of the groove 18 of the tire 10 is 25 mm or less, the amount of light incident on the inside of the groove 18, reflected on the bottom surface of the groove 18, and emitted to the outside of the groove 18 is not small. Here, since the first asterisk protrusion 34 and the second asterisk protrusion 36 protrude from the bottom surface 22 of the groove 18, even if the depth of the groove is 25 mm or less, the amount of light incident on the inside of the groove 18, reflected on the bottom surface 22 of the groove 18, and emitted to the outside of the groove 18 decreases.

For this reason, it is possible to effectively suppress an unused tire from giving an impression like a worn tire, as compared with the case where the brightness of the tread surface 16 and the brightness of the bottom surface 22 of the groove 18 are the same.

In recent years, due to environmental considerations, demand for tires having low rolling resistance that contribute to low fuel consumption of automobiles has been increasing. As a means for reducing the rolling resistance of a tire, for example, there is a technique for reducing the weight of a tire by thinning tread rubber and reducing the amount of rubber. When the tread rubber is thinned, the groove provided on the tread surface may become shallow. However, as described above, in the tire 10, the contrast between the tread surface 16 and the bottom surface 22 of the groove 18 becomes stronger, and it is possible to suppress the groove 18 of the tire 10 from giving an impression like being shallow (shallow groove feeling).

In the tire 10, the brightness L* of the first low brightness region 32 on the bottom surface 22 of the groove 18, the brightness L* of the second low brightness region 42 of the curved surface 24 of the groove 18, and the brightness L* of the third low brightness region 52 on the portion of the side surface 20 of the groove 18 on the curved surface 24 side are lower than the brightness L* of the tread surface 16. For this reason, the contrast with the portion on the bottom surface 22 side including the bottom surface 22 in the tread surface 16 and the groove 18 becomes stronger as compared with the case where only the brightness L* of the first low brightness region 32 of the bottom surface 22 of the groove 18 is lower than the brightness L* of the tread surface 16. With this, it is possible to suppress an unused tire from giving an impression like a worn tire.

In the tire 10, the brightness L* increases in the order of the first low brightness region 32, the second low brightness region 42, the third low brightness region, and the tread surface 16. As described above, since the brightness L* changes stepwise (gradually), such a situation that the groove 18 gives a sense of incongruity can be suppressed as compared with the case where only a portion L* where the brightness L* is high and a portion where the brightness L* is low are formed.

Further, in the tire 10, the third low brightness region 52 is formed only on the portion of the side surface 20 of the groove 18 on the curved surface 24 side. For this reason, the third low brightness region 52 is suppressed from being narrowed even when the tread surface 16 is worn as compared with the case where the third low brightness region 52 is formed on the entire side surface 20 of the groove 18. With this, the appearance of the groove 18 can be suppressed from changing.

The respective extending portions 34E of the first asterisk protrusion 34 extend in different directions, and the respective extending portions 36E of the second asterisk protrusion 36 extend in different directions. With this, even when the first low brightness region 32 is viewed while changing the viewing angle with respect to the first low brightness region 32, it is possible to suppress the appearance from being different. The second low brightness region 42 and the third low brightness region 52 also have the same actions.

Further, the first asterisk protrusions 34 include the six extending portions 34E extended in different directions and coupled at the center O1, and the second asterisk protrusions 36 include the six extending portions 36E extended in different directions and coupled at the center O2. Therefore, each of the first asterisk protrusions 34 and the second asterisk protrusions 36 is hard to fall down, and the durability of each of the first asterisk protrusions 34 and the second asterisk protrusions 36 can be improved. The first asterisk protrusions 44 and the second asterisk protrusions 46, and the first asterisk protrusions 54 and the second asterisk protrusions 56 also have the same actions.

The first asterisk protrusions 34 and the second asterisk protrusions 36 are coupled in a stepwise manner via the coupling portions 34A and 34B. With this, the first asterisk protrusions 34 and the second asterisk protrusions 36 support each other via the coupling portions 34A and 34B, and the fall of the first asterisk protrusions 34 and the second asterisk protrusions 36 is suppressed, and the durability can be improved. The first asterisk protrusions 44 and the second asterisk protrusions 46, and the first asterisk protrusions 54 and the second asterisk protrusions 56 also have the same actions.

Second Embodiment

Next, a tire 110 according to a second embodiment of the disclosure will be described with reference to FIG. 8 to FIG. 11. Regarding the tire 110 of the second embodiment, portions different from the tire 10 of the first embodiment will be mainly described.

Figure 8:
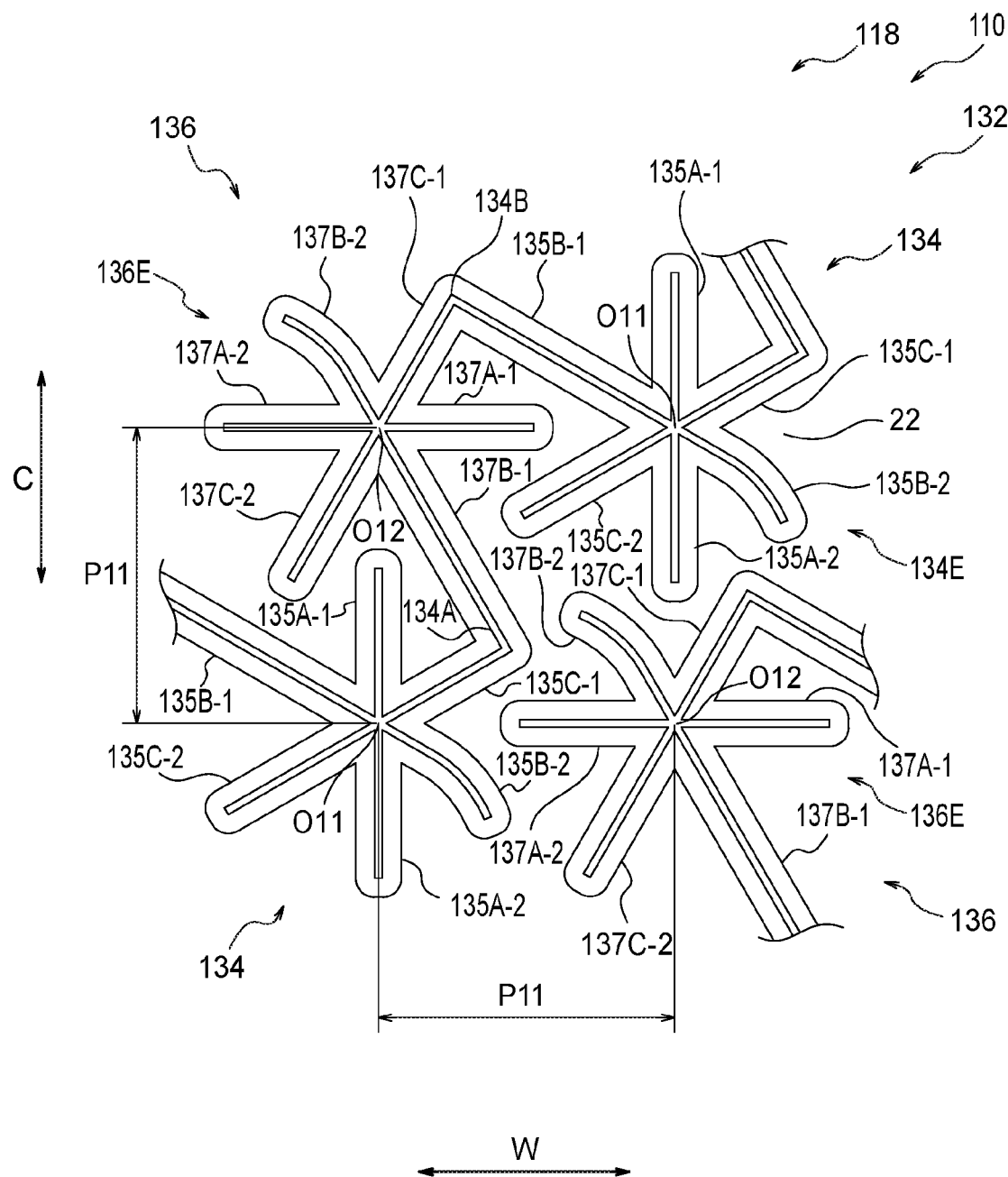
FIG. 8 is an enlarged plan view showing a protrusion formed in a first low brightness region of a groove of a tire according to a second embodiment of the disclosure.

The bottom surface 22 of a groove 118 of the tire 110 is a first low brightness region 132 having a lower brightness than the tread surface 16 (see FIG. 8). The curved surface 24 is a second low brightness region 142 having a lower brightness than the tread surface 16 and having a higher brightness than the first low brightness region 132 (see FIG. 9). A portion of the side surface 20 on the curved surface 24 side is a third low brightness region 152 having a lower brightness than the tread surface 16 and having a higher brightness than the second low brightness region 142 (see FIG. 10).

(First Low Brightness Region 132)

As shown in FIG. 8, the first low brightness region 132 includes a plurality of first asterisk protrusions 134 and a plurality of second asterisk protrusions 136 that protrude from the bottom surface 22. The first asterisk protrusions 134 and the second asterisk protrusions 136 are arranged alternately in the tire circumferential direction and the tire width direction. The first asterisk protrusion 134 and the second asterisk protrusion 136 are examples of protrusions.

[First Asterisk Protrusion 134]

As shown in FIG. 8, the first asterisk protrusion 134 has a shape similar to that of the first asterisk protrusion 34 of the first embodiment (see FIG. 3) as viewed from a direction orthogonal to the bottom surface 22. In the first asterisk protrusion 134, portions corresponding to the first extending portions 35A-1 and 35A-2, the second extending portions 35B-1 and 35B-2, the third extending portions 35C-1 and 35C-2, and the center O1 of the first asterisk protrusion 34 are referred to as first extending portions 135A-1 and 135A-2, second extending portions 135B-1 and 135B-2, third extending portions 135C-1 and 135C-2, and a center O11. Hereinafter, the above-mentioned six extending portions are collectively referred to as "extending portion 134E".

Figure 11A:
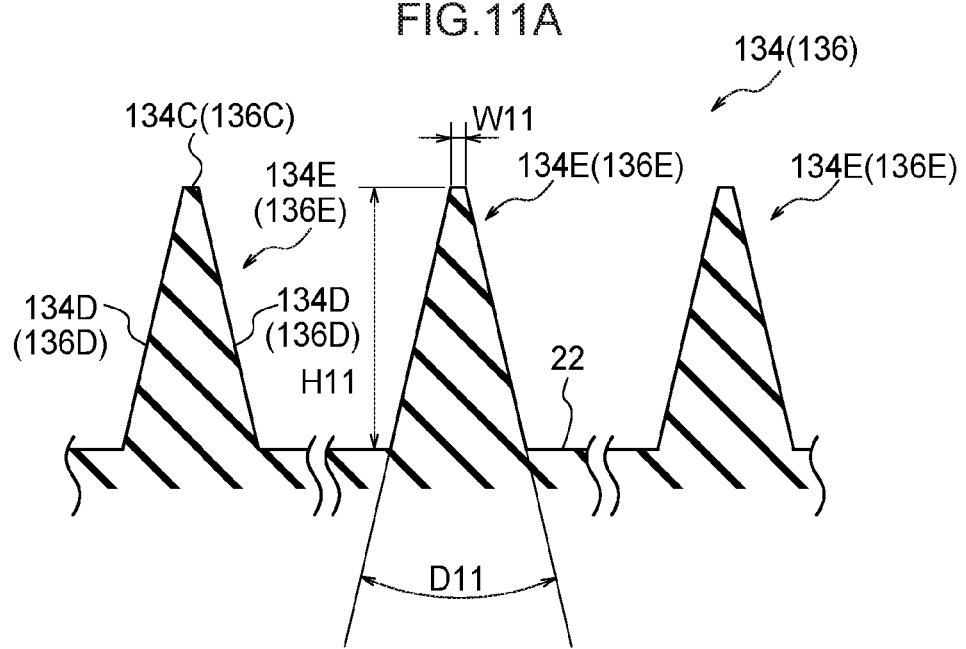
FIG. 11A is a cross-sectional view showing a protrusion formed in a groove of a tire according to a second embodiment of the disclosure.

As shown in FIG. 11A, in the extending portion 134E of the first asterisk protrusion 134, a cross section in a direction orthogonal to the extending direction is a substantially isosceles triangular shape having a flat top surface 134C. That is, the first asterisk protrusion 134 has the top surface 134C and a pair of side surfaces 134D. In the present embodiment, a width of the top surface 134C (W11 in the figure) is 0.02 mm, and an apex angle of the first asterisk protrusion 134 (D11 in the figure) is 26 [degrees]. A height of the first asterisk protrusion 44 (H11 in the figure) is one predetermined value of from 0.1 mm to 1.0 mm.

[Second Asterisk Protrusion 136]

As shown in FIG. 8, the second asterisk protrusion 136 has the same shape as the first asterisk protrusion 134. Specifically, the second asterisk protrusion 136 has a shape obtained by rotating the first asterisk protrusion 134 clockwise about the center O11 by 90 [degrees], and turning the first asterisk protrusion 134 rotated by 90 [degrees] about the center O11 upside down, as viewed from the direction orthogonal to the bottom surface 22.

In the second asterisk protrusion 136, portions corresponding to the first extending portions 135A-1 and 135A-2, the second extending portions 135B-1 and 135B-2, the third extending portions 135C-1 and 135C-2, and the center O11 of the first asterisk protrusion 134 are referred to as first extending portions 137A-1 and 137A-2, second extending portions 137B-1 and 137B-2, third extending portions 137C-1 and 137C-2, and a center O12. Hereinafter, the above-mentioned six extending portions are collectively referred to as "extending portion 136E".

In the second asterisk protrusion 136, a portion corresponding to the top surface 134C of the first asterisk protrusion 134 is referred to as a top surface 136C. In the second asterisk protrusion 136, portions corresponding to the side surfaces 134D of the first asterisk protrusion 134 are referred to as side surfaces 136D (see FIG. 11A).

[Others]

In the first asterisk protrusions 134 and the second asterisk protrusions 136 adjacent in the tire circumferential direction and the tire width direction, an interval between the center O11 and the center O12 (hereinafter, referred to as "interval P11") is one predetermined value of from more than 0.1 mm to 1.0 mm. In the present embodiment, the interval P11 is 0.6 mm as an example. The first low brightness region 132 described in the present embodiment is a region where the value of the brightness L* measured using a handy spectrophotometer (NF333) of Nippon Denshoku Industries Co., Ltd. is 10 or less as an example.

(Second Low Brightness Region 142)

Figure 9:
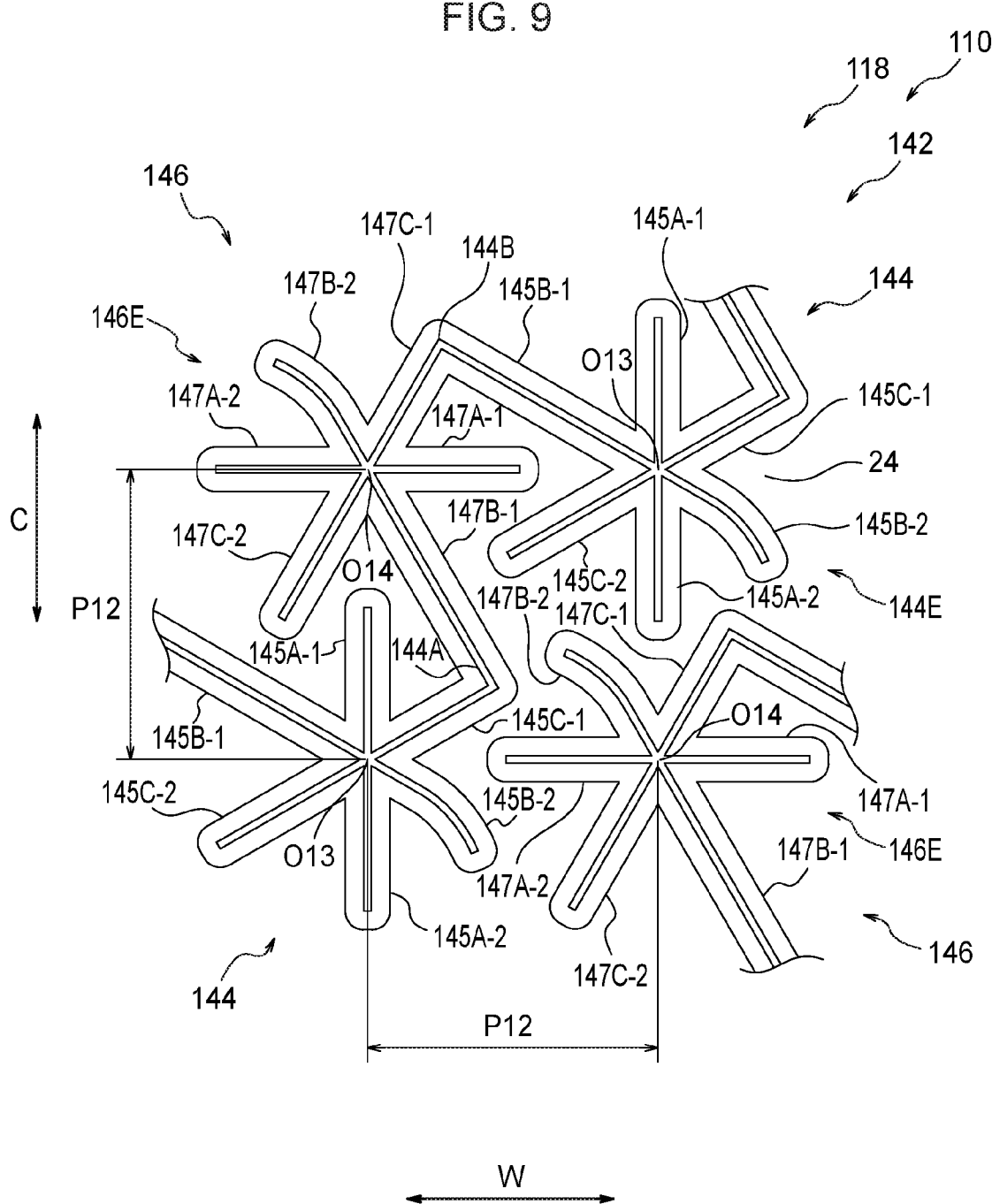
FIG. 9 is an enlarged plan view showing a protrusion formed in a second low brightness region of a groove of a tire according to a second embodiment of the disclosure.

As shown in FIG. 9, the second low brightness region 142 includes a plurality of first asterisk protrusions 144 and a plurality of second asterisk protrusions 146 that protrude from the curved surface 24. The first asterisk protrusions 144 and the second asterisk protrusions 146 are arranged alternately in the tire circumferential direction and the tire width direction. The first asterisk protrusion 144 and the second asterisk protrusion 146 are examples of other protrusions.

[First Asterisk Protrusion 144]

As shown in FIG. 9, the first asterisk protrusion 144 has a shape similar to that of the first asterisk protrusion 134 (see FIG. 8) as viewed from a direction orthogonal to the curved surface 24. In the first asterisk protrusion 144, portions corresponding to the first extending portions 135A-1 and 135A-2, the second extending portions 135B-1 and 135B-2, the third extending portions 135C-1 and 135C-2, and the center O11 of the first asterisk protrusion 134 are referred to as first extending portions 145A-1 and 145A-2, second extending portions 145B-1 and 145B-2, third extending portions 145C-1 and 145C-2, and a center O13. Hereinafter, the above-mentioned six extending portions are collectively referred to as "extending portion 144E".

Figure 11B:
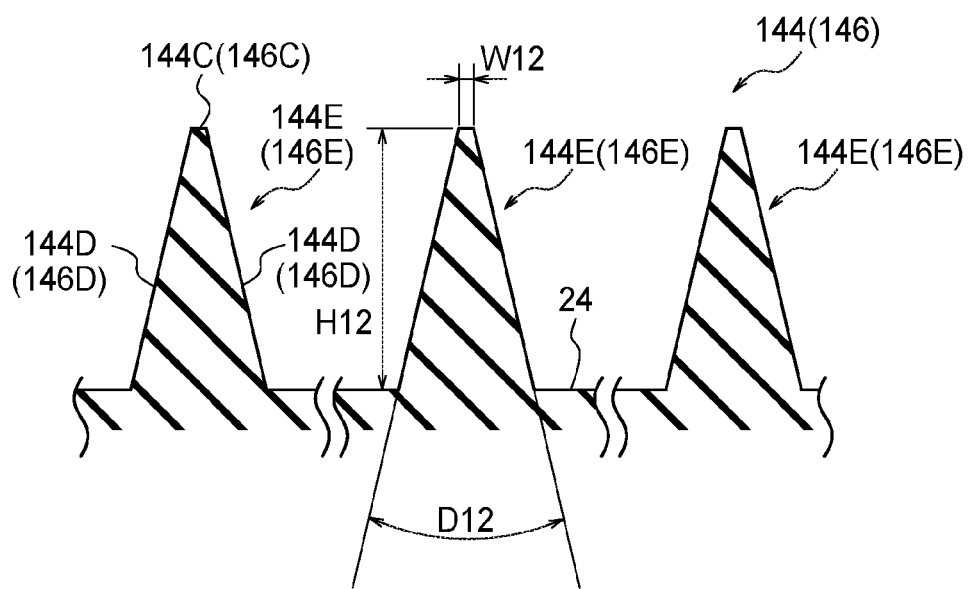
FIG. 11B is a cross-sectional view showing a protrusion formed in a groove of the tire according to the second embodiment of the disclosure.

As shown in FIG. 11B, in the extending portion 144E of the first asterisk protrusion 144, a cross section in a direction orthogonal to the extending direction is a substantially isosceles triangular shape having a flat top surface 144C. That is, the first asterisk protrusion 144 has the top surface 144C and a pair of side surfaces 144D. In the present embodiment, a width of the top surface 144C (W12 in the figure) is 0.02 mm, and an apex angle of the first asterisk protrusion 144 (D12 in the figure) is 26 [degrees]. A height of the first asterisk protrusion 144 (H12 in the figure) is one predetermined value of from 0.1 mm to 1.0 mm. In the present embodiment, the height of the first asterisk protrusion 144 (H12 in the figure) is the same as the height of the first asterisk protrusion 134.

[Second Asterisk Protrusion 146]

As shown in FIG. 9, the second asterisk protrusion 146 has the same shape as the first asterisk protrusion 144. Specifically, the second asterisk protrusion 146 has a shape obtained by rotating the first asterisk protrusion 144 clockwise about the center O13 by 90 [degrees], and turning the first asterisk protrusion 144 rotated by 90 [degrees] about the center O13 upside down, as viewed from a direction orthogonal to the curved surface 24.

In the second asterisk protrusion 146, portions corresponding to the first extending portions 145A-1 and 145A-2, the second extending portions 145B-1 and 145B-2, the third extending portions 145C-1 and 145C-2, and the center O13 of the first asterisk protrusion 144 are referred to as first extending portions 147A-1 and 147A-2, second extending portions 147B-1 and 147B-2, third extending portions 147C-1 and 147C-2, and a center O14. Hereinafter, the above-mentioned six extending portions are collectively referred to as "extending portion 146E".

In the second asterisk protrusion 146, a portion corresponding to the top surface 144C of the first asterisk protrusion 144 is referred to as a top surface 146C. In the second asterisk protrusion 146, portions corresponding to the side surfaces 144D of the first asterisk protrusion 144 are referred to as side surfaces 146D (see FIG. 11B).

[Others]

In the first asterisk protrusions 144 and the second asterisk protrusions 146 adjacent in the tire circumferential direction and the tire width direction, an interval between the center O13 and the center O14 (hereinafter, referred to as "interval P12") is one predetermined value of from more than 0.1 mm to 1.0 mm. In the present embodiment, the interval P12 is 0.8 mm as an example. The second low brightness region 142 described in the present embodiment is a region where the value of the brightness L* measured using a handy spectrophotometer (NF333) of Nippon Denshoku Industries Co., Ltd. is from more than 10 to 12 as an example.

(Third Low Brightness Region 152)

Figure 10:
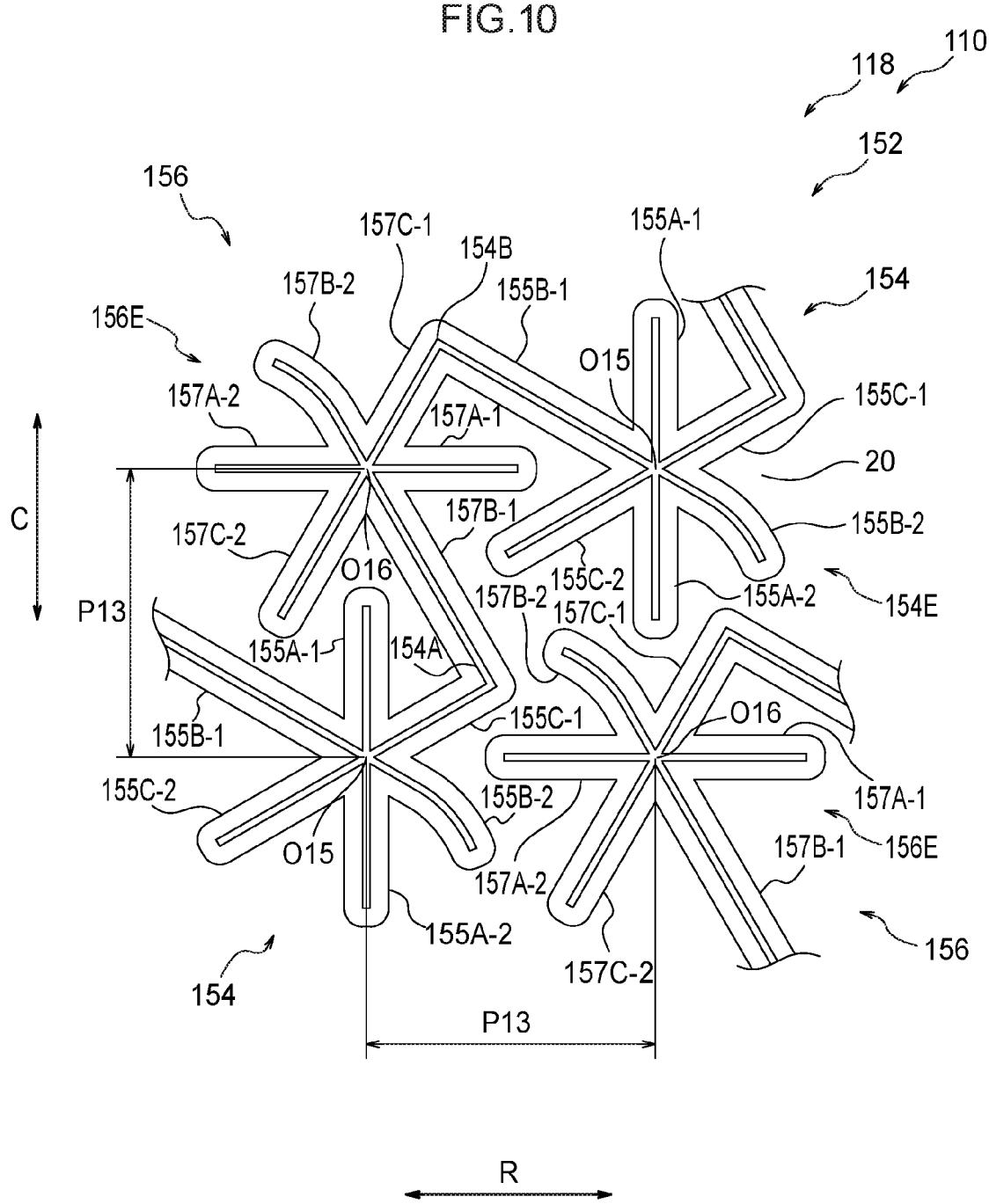
FIG. 10 is an enlarged plan view showing a protrusion formed in a third low brightness region of a groove of a tire according to a second embodiment of the disclosure.

As shown in FIG. 10, the third low brightness region 152 includes a plurality of first asterisk protrusions 154 and a plurality of second asterisk protrusions 156 that protrude from the side surface 20. The first asterisk protrusions 154 and the second asterisk protrusions 156 are arranged alternately in the tire circumferential direction and the tire radial direction. The first asterisk protrusion 154 and the second asterisk protrusion 156 are examples of other protrusions.

[First Asterisk Protrusion 154]

As shown in FIG. 10, the first asterisk protrusion 154 has a shape similar to that of the first asterisk protrusion 134 (see FIG. 8) as viewed from the direction orthogonal to the side surface 20. In the first asterisk protrusion 154, portions corresponding to the first extending portions 135A-1 and 135A-2, the second extending portions 135B-1 and 135B-2, the third extending portions 135C-1 and 135C-2, and the center O11 of the first asterisk protrusion 134 are referred to as first extending portions 155A-1 and 155A-2, second extending portions 155B-1 and 155B-2, third extending portions 155C-1 and 155C-2, and a center O15. Hereinafter, the above-mentioned six extending portions are collectively referred to as "extending portion 154E".

Figure 11C:
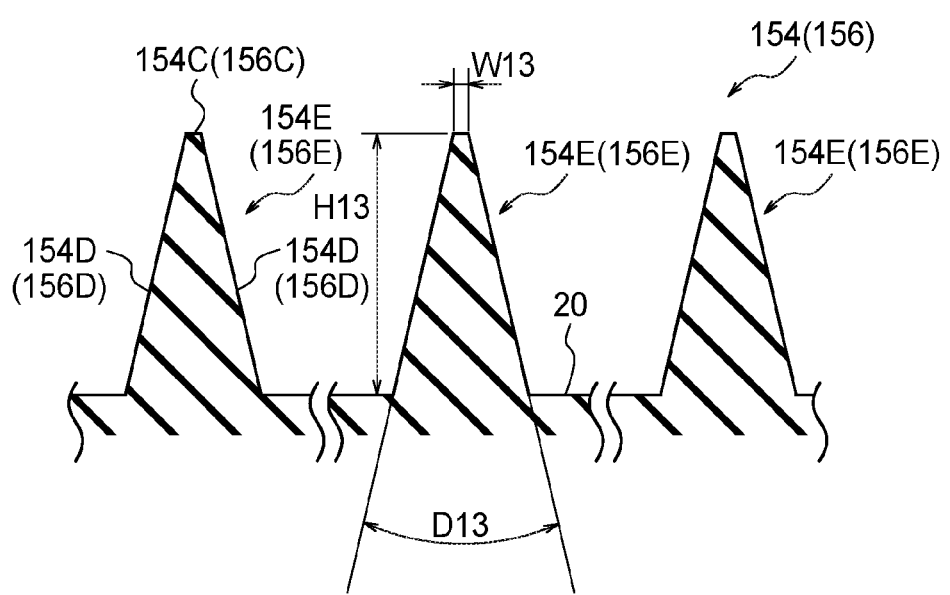
FIG. 11C is a cross-sectional view showing a protrusion formed in a groove of the tire according to the second embodiment of the disclosure.

As shown in FIG. 11C, in the extending portion 154E of the first asterisk protrusion 154, a cross section in a direction orthogonal to the extending direction is a substantially isosceles triangular shape having a flat top surface 154C. That is, the first asterisk protrusion 154 has the top surface 154C and a pair of side surfaces 154D. In the present embodiment, a width of the top surface 154C (W13 in the figure) is 0.02 mm, and an apex angle of the first asterisk protrusion 154 (D13 in the figure) is 26 [degrees]. A height of the first asterisk protrusion 44 (H13 in the figure) is one predetermined value of from 0.1 mm to 1.0 mm. In the present embodiment, the height of the first asterisk protrusion 154 (13 in the figure) is the same as the height of the first asterisk protrusion 134.

[Second Asterisk Protrusion 156]

As shown in FIG. 10, the second asterisk protrusion 156 has the same shape as the first asterisk protrusion 154. Specifically, the second asterisk protrusion 156 has a shape obtained by rotating the first asterisk protrusion 154 clockwise about the center O15 by 90 [degrees], and turning the first asterisk protrusion 154 rotated by 90 [degrees] about the center O15 upside down, as viewed from the direction orthogonal to the side surface 20.

In the second asterisk protrusion 156, portions corresponding to the first extending portions 155A-1 and 155A-2, the second extending portions 155B-1 and 155B-2, the third extending portions 155C-1 and 155C-2, and the center O15 of the first asterisk protrusion 154 are referred to as first extending portions 157A-1 and 157A-2, second extending portions 157B-1 and 157B-2, third extending portions 157C-1 and 157C-2, and a center O16. Hereinafter, the above-mentioned six extending portions are collectively referred to as "extending portion 156E".

In the second asterisk protrusion 156, a portion corresponding to the top surface 154C of the first asterisk protrusion 154 is referred to as a top surface 156C. In the second asterisk protrusion 156, portions corresponding to the side surfaces 154D of the first asterisk protrusion 154 are referred to as side surfaces 156D (see FIG. 11C).

[Others]

In the first asterisk protrusions 154 and the second asterisk protrusions 156 adjacent in the tire circumferential direction and the tire radial direction, an interval between the center O15 and the center O16 (hereinafter, referred to as "interval P13") is one predetermined value of from more than 0.1 mm to 1.0 mm. In the present embodiment, the interval P13 is 1.0 mm as an example. The third low brightness region 152 described in the present embodiment is a region where the value of the brightness L* measured using a handy spectrophotometer (NF333) of Nippon Denshoku Industries Co., Ltd. is from more than 12 to 14 as an example.

(Actions and Summary)

The interval P11 between the first asterisk protrusion 134 and the second asterisk protrusion 136 formed in the first low brightness region 132 is 0.6 mm (see FIG. 8). The interval P12 between the first asterisk protrusion 144 and the second asterisk protrusion 146 formed in the second low brightness region 142 is 0.8 mm (see FIG. 9). The interval P13 between the first asterisk protrusion 154 and the second asterisk protrusion 156 formed in the third low brightness region 152 is 1.0 mm (see FIG. 10).

Accordingly, in the second low brightness region 142, the amount of light incident on the inside of the groove and emitted to the outside of the groove 118 is larger than the amount of light emitted to the outside of the groove 118 in the first low brightness region 32. In the third low brightness region 152, the amount of light emitted to the outside of the groove 118 is larger than the amount of light emitted to the outside of the groove 118 in the second low brightness region 142. That is, the brightness L* increases in the order of the first low brightness region 132, the second low brightness region 142, the third low brightness region 152, and the tread surface 16. Thus, the brightness L* changes stepwise (gradually).

Other actions of the second embodiment are the same as the actions of the first embodiment.

Third Embodiment

Next, a tire 210 according to a third embodiment of the disclosure will be described with reference to FIG. 12. Regarding the tire 210 of the third embodiment, portions different from the tire 10 of the first embodiment will be mainly described.

The bottom surface 22 of a groove 218 of the tire 210 is a first low brightness region 232 having a lower brightness than the tread surface 16. The curved surface 24 is a second low brightness region 242 having a lower brightness than the tread surface 16 and having a higher brightness than the first low brightness region 232. A portion of the side surface 20 on the curved surface 24 side is a third low brightness region 252 having a lower brightness than the tread surface 16 and having a higher brightness than the second low brightness region 242.

(First Low Brightness Region 232)

Figure 12:
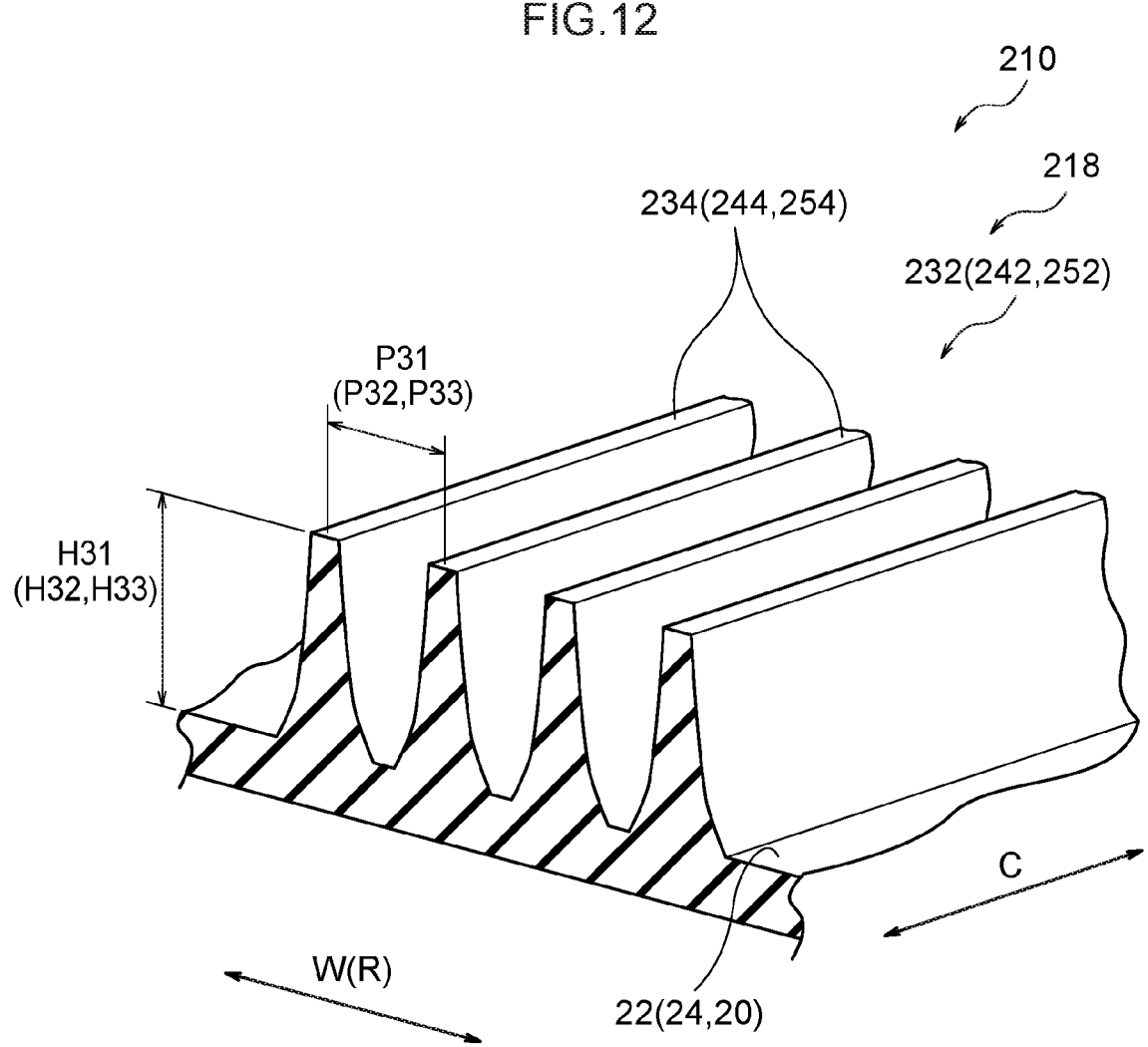
FIG. 12 is a sectional perspective view showing a protrusion formed in a groove of a tire according to a third embodiment of the disclosure.

As shown in FIG. 12, the first low brightness region 232 has a plurality of protrusions 234 that protrude from the bottom surface 22. The protrusions 234 are arranged at intervals in the tire width direction.

The protrusion 234 has a plate shape extending in the tire circumferential direction, and the plate surface faces the tire width direction. The plate thickness of the protrusion 234 gradually decreases from the base end on the bottom surface 22 side to the distal end. Specifically, the reduction rate of the plate thickness at the base end portion is higher than the reduction ratio of the plate thickness at the distal end portion.

A height of the protrusion 234 (H31) from the bottom surface 22 is from 0.1 mm to 1.0 mm, and in the present embodiment, the height (H31) is 0.8 mm as an example. Further, an interval between the protrusions 234 adjacent in the tire width direction (hereinafter, referred to as "interval P31") is one predetermined value of from more than 0.1 mm to 1.0 mm.

Here, the first low brightness region 232 described in the present embodiment is a region where the value of the brightness L* measured using a handy spectrophotometer (NF333) of Nippon Denshoku Industries Co., Ltd. is 10 or less as an example.

(Second Low Brightness Region 242)

As shown in FIG. 12, the second low brightness region 242 has a plurality of protrusions 244 that protrude from the curved surface 24. The protrusions 244 are arranged at intervals in the tire width direction. Regarding the protrusion 244, portions different from the protrusion 234 will be mainly described.

A height of the protrusion 244 (H32) from the curved surface 24 is from 0.1 mm to 1.0 mm, and in the present embodiment, the height (H32) is 0.6 mm as an example. Further, an interval between the protrusions 244 adjacent in the tire width direction (hereinafter, referred to as "interval P32") is one predetermined value of from more than 0.1 mm to 1.0 mm, and is the same value as the above-described P31.

Here, the second low brightness region 242 described in the present embodiment is a region where the value of the brightness L* measured using a handy spectrophotometer (NF333) of Nippon Denshoku Industries Co., Ltd. is from more than 10 to 12 as an example.

(Third Low Brightness Region 252)

As shown in FIG. 12, the third low brightness region 252 has a plurality of protrusions 254 that protrude from the side surface 20. The protrusions 254 are arranged at intervals in the tire radial direction. Regarding the protrusion 254, portions different from the protrusion 234 will be mainly described.

A height of the protrusion 254 (H33) from the side surface 20 is from 0.1 mm to 1.0 mm, and in the present embodiment, the height (H33) is 0.4 mm as an example. Further, an interval between the protrusions 254 adjacent in the tire radial direction (hereinafter, referred to as "interval P33") is one predetermined value of from more than 0.1 mm to 1.0 mm, and is the same value as the above-described P31.

Here, the third low brightness region 252 described in the present embodiment is a region where the value of the brightness L* measured using a handy spectrophotometer (NF333) of Nippon Denshoku Industries Co., Ltd. is from more than 12 to 14 as an example.

The actions of the third embodiment are the same as the actions of the first embodiment except for the actions caused by the protrusion having the asterisk shape.

Fourth Embodiment

Next, a tire 310 according to a fourth embodiment of the disclosure will be described with reference to FIG. 13. Regarding the tire 310 of the fourth embodiment, portions different from the tire 110 of the second embodiment will be mainly described.

The bottom surface 22 of a groove 318 of the tire 310 is a first low brightness region 332 having a lower brightness than the tread surface 16. The curved surface 24 is a second low brightness region 342 having a lower brightness than the tread surface 16 and having a higher brightness than the first low brightness region 332. A portion of the side surface 20 on the curved surface 24 side is a third low brightness region 352 having lower brightness than the tread surface 16 and higher brightness than the second low brightness region 342.

(First Low Brightness Region 332)

Figure 13:
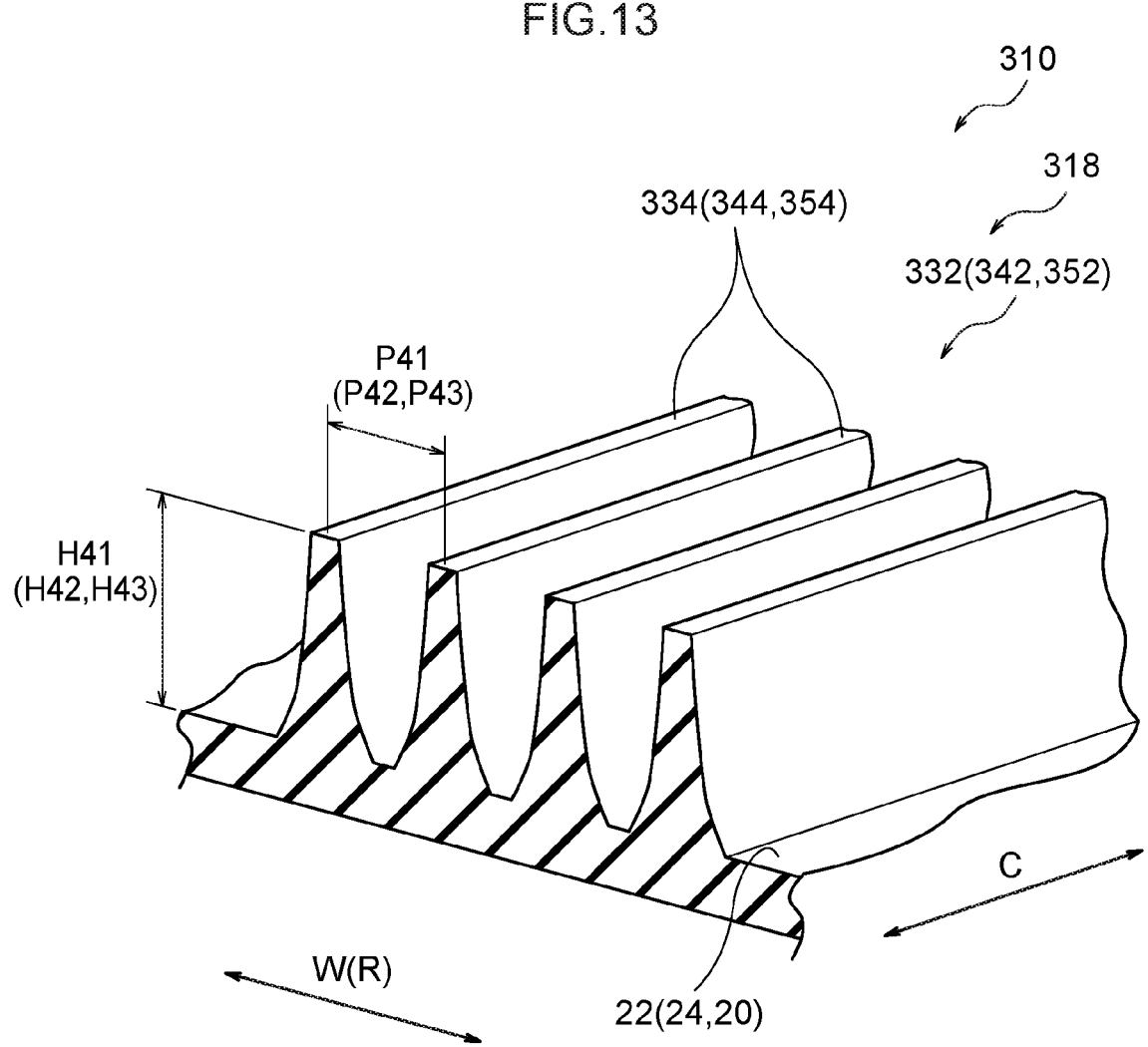
FIG. 13 is a sectional perspective view showing a protrusion formed in a groove of a tire according to a fourth embodiment of the disclosure.

As shown in FIG. 13, the first low brightness region 332 has a plurality of protrusions 334 that protrude from the bottom surface 22. The protrusions 334 are arranged at intervals in the tire width direction.

The protrusion 334 has a plate shape extending in the tire circumferential direction, and the plate surface faces the tire width direction. The plate thickness of the protrusion 334 gradually decreases from the base end on the bottom surface 22 side to the distal end. Specifically, the reduction rate of the plate thickness at the base end portion is higher than the reduction ratio of the plate thickness at the distal end portion.

A height of the protrusion 334 from the bottom surface 22 (H41) is one predetermined value of from 0.1 mm to 1.0 mm. Further, an interval between the protrusions 334 adjacent in the tire width direction (hereinafter, referred to as "interval P41") is from more than 0.1 mm to 1.0 mm, and in the present embodiment, the interval P41 is 0.6 mm as an example.

Here, the first low brightness region 332 described in the present embodiment is a region where the value of the brightness L* measured using a handy spectrophotometer (NF333) of Nippon Denshoku Industries Co., Ltd. is 10 or less as an example.

(Second Low Brightness Region 342)

As shown in FIG. 13, the second low brightness region 342 has a plurality of protrusions 344 that protrude from the curved surface 24. The protrusions 344 are arranged at intervals in the tire width direction. Regarding the protrusion 344, portions different from the protrusion 334 will be mainly described.

A height of the protrusion 344 (H42) from the curved surface 24 is from 0.1 mm to 1.0 mm, and is the same value as the above-described height H41 of the protrusion 334. Further, an interval between the protrusions 344 adjacent in the tire width direction (hereinafter, referred to as "interval P42") is from more than 0.1 mm to 1.0 mm, and in the present embodiment, the interval P42 is 0.8 mm as an example.

Here, the second low brightness region 342 described in the present embodiment is a region where the value of the brightness L* measured using a handy spectrophotometer (NF333) of Nippon Denshoku Industries Co., Ltd. is from more than 10 to 12 as an example.

(Third Low Brightness Region 352)

As shown in FIG. 13, the third low brightness region 352 has a plurality of protrusions 354 that protrude from the side surface 20. The protrusions 354 are arranged at intervals in the tire radial direction. Regarding the protrusion 354, portions different from the protrusion 334 will be mainly described.

A height of the protrusion 354 (H43) from the side surface 20 is from 0.1 mm to 1.0 mm, and is the same value as the above-described height H41 of the protrusion 334. Further, an interval between the protrusions 354 adjacent in the tire width direction (hereinafter, referred to as "interval P43") is from more than 0.1 mm to 1.0 mm, and in the present embodiment, the interval P43 is 1.0 mm as an example.

Here, the third low brightness region 352 described in the present embodiment is a region where the value of the brightness L* measured using a handy spectrophotometer (NF333) of Nippon Denshoku Industries Co., Ltd. is from more than 12 to 14 as an example.

The actions of the third embodiment are the same as the actions of the second embodiment except for the actions caused by the protrusion having the asterisk shape.

Although the disclosure has been described in detail with respect to specific embodiments, the disclosure is not limited to such embodiments, and it is clearly understood for a person skilled in the art that various other embodiments are possible within the scope of the disclosure. For example, although not particularly described in the above embodiments, the protrusion may be provided in a main groove or may be provided in a lug groove.

Although not specifically described in the above embodiments, the brightness of the tread surface 16 may be reduced by forming three or more types of protrusions on the bottom surface 22, the side surfaces 20, and the curved surfaces 24.

In the above embodiments, the protrusion is formed on the portion of the side surface 20 on the curved surface 24 side, but the protrusion may be formed on the entire side surface 20. In this case, the actions caused by forming the protrusion on the portion of the side surface 20 on the curved surface 24 side do not occur.

In the above embodiments, the ratio of the height of the protrusion to the depth of the groove 18 (protrusion height/groove depth), the depth of the groove 18, and the ratio of the groove width to the groove depth of the groove 18 (groove width/groove depth) are defined, but these need not be particularly defined. By forming protrusions on the bottom surface 22, the curved surfaces 24, and the side surfaces 20 of the groove 18, it is possible to suppress an unused tire from giving an impression like a worn tire due to the contrast between the tread surface 16 and the portion of the groove 18 on the bottom surface 22 side as compared with the case of forming protrusions on only the bottom surface 22 and the curved surfaces 24.

The disclosure of Japanese Patent Application Laid-Open (JP-A) No. 2017-236465 filed on Dec. 8, 2017 is incorporated herein by reference in its entirety.

All documents, patent applications, and technical standards mentioned herein are incorporated herein by reference to the same extent as if each individual document, patent application, and technical standard were specifically and individually stated to be incorporated by reference.

The invention claimed is:

1. A tire comprising:
    a tread portion including a tread surface and a groove that partitions the tread surface; and
    a plurality of protrusions that protrude from a bottom surface of the groove at a height of from 0.1 mm to 1.0 mm and are arranged at an interval of from more than 0.1 mm to 1.0 mm,
    wherein a ratio of a height of the protrusions to a depth of the groove (protrusion height/groove depth) is from 0.02 to 0.2,
    wherein the groove includes a pair of side surfaces, the bottom surface, and a pair of curved surfaces connecting the side surfaces and the bottom surface,
    wherein the tire further includes a plurality of other protrusions that protrude from the side surfaces and the curved surfaces at a height of from 0.1 mm to 1.0 mm and are arranged at an interval of from more than 0.1 mm to 1.0 mm,
    wherein the height of the protrusions formed on the bottom surface, the height of the other protrusions formed on the curved surfaces, and the height of the other protrusions formed on the side surfaces decrease in this order, and
    wherein an apex angle of each of the plurality of protrusions that protrude from the bottom surface and an apex angle of each of the plurality of other protrusions that protrude from the side surfaces and the curved surfaces is 26 degrees.

2. The tire according to claim 1, wherein the depth of the groove is from 2 mm to 25 mm.

3. The tire according to claim 1, wherein the other protrusions formed on the side surfaces are arranged on portions of the side surfaces at the curved surface sides of the side surfaces.

4. A tire comprising:
- a tread portion including a tread surface and a groove that partitions the tread surface; and
- a plurality of protrusions that protrude from a bottom surface of the groove at a height of from 0.1 mm to 1.0 mm and are arranged at an interval of from more than 0.1 mm to 1.0 mm,
- wherein a ratio of a height of the protrusions to a depth of the groove (protrusion height/groove depth) is from 0.02 to 0.2,
- wherein the groove includes a pair of side surfaces, the bottom surface, and a pair of curved surfaces connecting the side surfaces and the bottom surface,
- wherein the tire further includes a plurality of other protrusions that protrude from the side surfaces and the curved surfaces at a height of from 0.1 mm to 1.0 mm and are arranged at an interval of from more than 0.1 mm to 1.0 mm,
- wherein the interval of the protrusions formed on the bottom surface, the interval of the other protrusions formed on the curved surfaces, and the interval of the other protrusions formed on the side surfaces increase in this order, and
- wherein an apex angle of each of the plurality of protrusions that protrude from the bottom surface and an apex angle of each of the plurality of other protrusions that protrude from the side surfaces and the curved surfaces is 26 degrees.

5. The tire according to claim 4, wherein the depth of the groove is from 2 mm to 25 mm.

6. The tire according to claim 4, wherein the other protrusions formed on the side surfaces are arranged on portions of the side surfaces at the curved surface sides of the side surfaces.

\* \* \* \* \*